US009182071B2

(12) United States Patent
Harper et al.

(10) Patent No.: US 9,182,071 B2
(45) Date of Patent: Nov. 10, 2015

(54) DISPLAY STAND

(75) Inventors: Pierre Harper, Portland, OR (US); Kai Halsinger, Portland, OR (US); Dave Sayler, Portland, OR (US); Tze Ming Lee, Singapore (SG); Thomas Crisp, Walnut Creek, CA (US); Takenori Kaneda, Shimotsuke (JP); Shinya Aoki, Kuki (JP)

(73) Assignee: Wacom Co., Ltd., Kazo-shi (JP)

( * ) Notice: Subject to any disclaimer, the term of this patent is extended or adjusted under 35 U.S.C. 154(b) by 524 days.

(21) Appl. No.: 13/241,042

(22) Filed: Sep. 22, 2011

(65) Prior Publication Data

US 2013/0021723 A1   Jan. 24, 2013

(30) Foreign Application Priority Data

Jul. 22, 2011   (JP) ................................ 2011-160817

(51) Int. Cl.
| | |
|---|---|
| *G06F 1/16* | (2006.01) |
| *H05K 5/00* | (2006.01) |
| *H05K 7/00* | (2006.01) |
| *F16M 11/10* | (2006.01) |
| *F16M 11/20* | (2006.01) |

(52) U.S. Cl.
CPC ........... *F16M 11/10* (2013.01); *F16M 11/2021* (2013.01); *G06F 1/1601* (2013.01); *G06F 1/1681* (2013.01); *F16M 2200/022* (2013.01); *F16M 2200/024* (2013.01)

(58) Field of Classification Search
CPC ...................................................... G06F 1/1601
USPC ............. 361/679.06, 679.21, 679.22, 679.26, 361/679.27; 248/274.1, 276.1, 284.1, 248/291.1, 292.11
See application file for complete search history.

(56) References Cited

U.S. PATENT DOCUMENTS

| | | | | |
|---|---|---|---|---|
| 5,255,214 | A * | 10/1993 | Ma ............................ | 361/679.06 |
| 6,005,767 | A * | 12/1999 | Ku et al. ................... | 361/679.27 |
| 6,219,681 | B1 * | 4/2001 | Hawkins et al. ............. | 708/100 |
| 6,464,195 | B1 * | 10/2002 | Hildebrandt .................. | 248/460 |
| 6,654,068 | B1 * | 11/2003 | Brewington et al. ......... | 348/827 |

(Continued)

FOREIGN PATENT DOCUMENTS

| | | |
|---|---|---|
| DE | 28 31 428 A1 | 1/1980 |
| JP | 06-187068 A | 7/1994 |

(Continued)

OTHER PUBLICATIONS

Office Action mailed Mar. 12, 2015, issued in corresponding Taiwanese Application No. 100147387, filed Dec. 20, 2011.

(Continued)

*Primary Examiner* — Terrell McKinnon
*Assistant Examiner* — Michael McDuffie
(74) *Attorney, Agent, or Firm* — Christenson O'Connor Johnson Kindness PLLC

(57) ABSTRACT

Disclosed herein is a display stand including: a base member having a pair of side surface sections, a front end section, and a back end section; a pair of arm sections; first hinge sections by which respective first end portions of the pair of arm sections are connected respectively to the pair of side surface sections of the base member so that the pair of arm sections can be turned relative to the base member; and second hinge sections by which second end portions of the pair of arm sections are connected to a display so that the display can be turned relative to the pair of arm sections.

15 Claims, 13 Drawing Sheets

(56) References Cited

U.S. PATENT DOCUMENTS

| | | | |
|---|---|---|---|
| 6,665,175 B1* | 12/2003 | deBoer et al. | 361/679.06 |
| 6,745,986 B1 | 6/2004 | Bright | |
| 6,972,947 B2* | 12/2005 | Duncan | 361/679.55 |
| 7,203,058 B2* | 4/2007 | Hong | 361/679.06 |
| 7,221,562 B2* | 5/2007 | Song | 361/679.06 |
| 7,232,098 B2 | 6/2007 | Rawlings et al. | 248/121 |
| 7,551,426 B2* | 6/2009 | Huang et al. | 361/679.02 |
| 7,589,958 B2* | 9/2009 | Smith | 361/679.02 |
| 7,630,193 B2* | 12/2009 | Ledbetter et al. | 361/679.21 |
| 7,724,511 B2* | 5/2010 | Jacobs | 361/679.27 |
| 8,259,437 B2* | 9/2012 | Vesely | 361/679.01 |
| 8,264,828 B2* | 9/2012 | Chang et al. | 361/679.28 |
| 8,520,374 B2* | 8/2013 | Lin et al. | 361/679.06 |
| 2002/0053629 A1* | 5/2002 | Hokugoh | 248/371 |
| 2006/0039104 A1* | 2/2006 | Wang et al. | 361/681 |
| 2006/0209510 A1* | 9/2006 | Kamimaki et al. | 361/686 |
| 2007/0058331 A1* | 3/2007 | Schwager et al. | 361/683 |
| 2008/0123266 A1* | 5/2008 | Hung | 361/681 |

FOREIGN PATENT DOCUMENTS

| | | |
|---|---|---|
| JP | 06-259168 A | 9/1994 |
| JP | 2000-181576 A | 6/2000 |
| JP | 2002-023650 A | 1/2002 |
| JP | 2003-280533 | 10/2003 |
| JP | 2005-165636 A | 6/2005 |
| JP | 2009-069554 | 4/2009 |
| TW | 393597 B | 6/2000 |
| TW | I328786 B | 8/2010 |
| TW | I330237 B | 9/2010 |
| TW | I333038 B | 11/2010 |
| TW | I333785 B | 11/2010 |

OTHER PUBLICATIONS

Japanese Office Action dated Jun. 3, 2015, issued in corresponding Japanese Application No. 2011-160817, filed Jul. 22, 2011, 2 pages.

Chinese Office Action mailed Jul. 29, 2015, issued in corresponding Chinese Application No. 201210016646.X, filed Jan. 18, 2012, 8 pages.

* cited by examiner

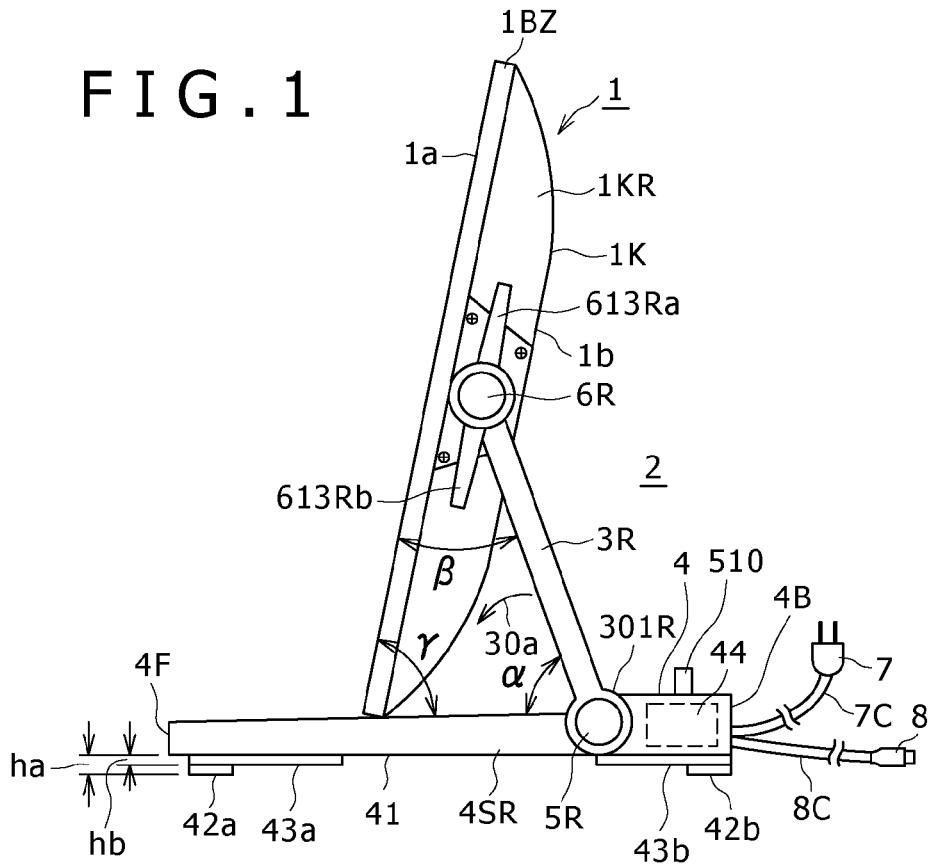
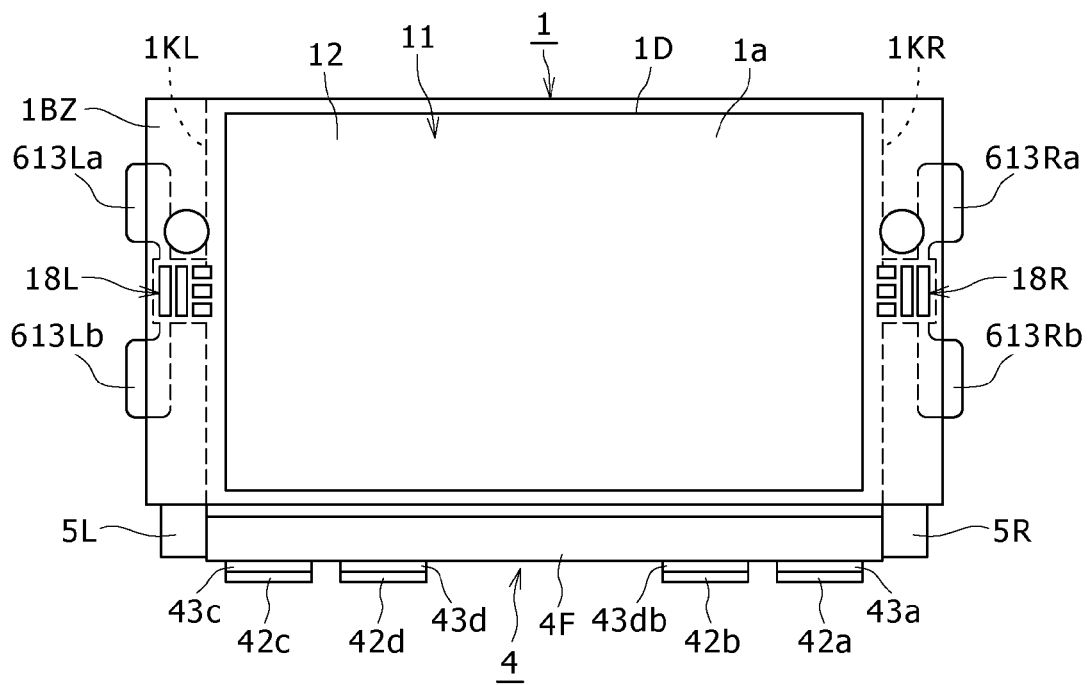

F I G. 5
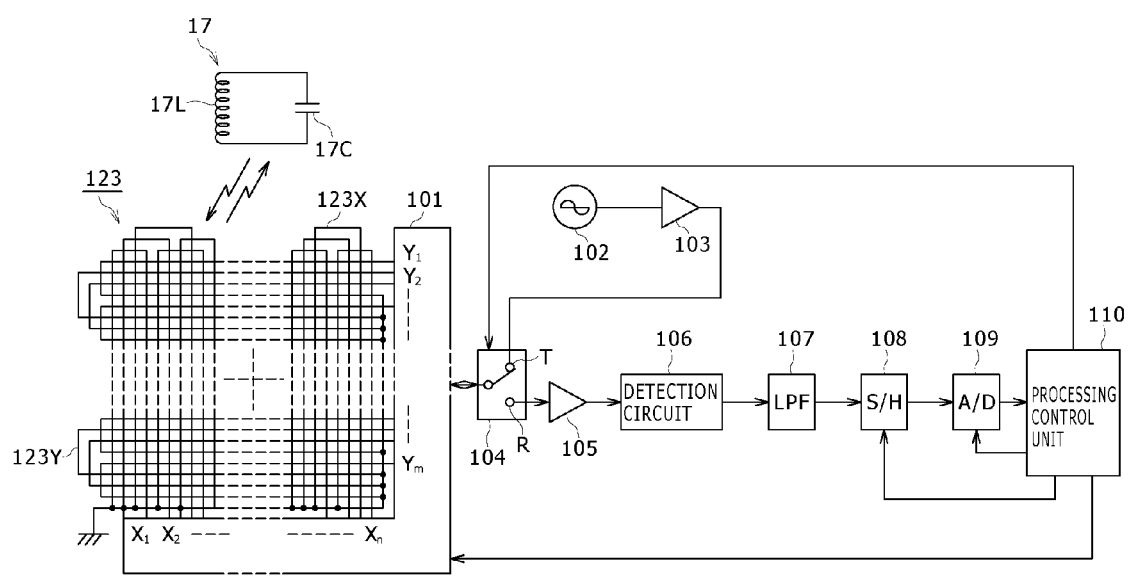

DISPLAY STAND

CROSS-REFERENCES TO RELATED APPLICATIONS

This application claims priority from JP Patent Application No. 2011-160817, filed Jul. 22, 2011, which is hereby incorporated by reference herein in its entirety and for all purposes.

FIELD OF INVENTION

The present application relates to a display stand suited for use as a stand for a flat type display such as, for example, a liquid crystal display.

BACKGROUND

In recent years, flat type displays (flat display panels), such as liquid crystal displays, have come to be the mainstream of displays. This kind of flat type display is used in a variety of modes, such as a mode in which the display is used with the display screen set in a nearly vertical state (e.g., in a substantially upright state) or a mode in which the display is used with the display screen set in a nearly horizontal state (e.g., in a state of being laid flat).

Monitor devices are known wherein the inclination of a monitor main body can be adjusted, e.g., as disclosed in Japanese Patent Laid-open Nos. 2003-280533, 2009-69554, and Hei 6-259168 (hereinafter referred to as Patent Documents 1, 2, and 3, respectively). The monitor devices disclosed in Patent Documents 1 to 3 have a structure in which link members or arms are interposed between the back surface of the monitor main body on the side opposite to the display screen and a base member of a stand so that the inclination of the monitor main body can be adjusted.

To be more specific, the monitor device described in Patent Document 1 has a stand that includes a base member for supporting the monitor main body and link members interposed between the monitor main body and the base member. In particular, the monitor device includes base hinges for turnably connecting one-side ends of link members to the base member, monitor hinges for connecting the other-side ends of the link members to the back surface on the side opposite to the display screen of the monitor main body so that the monitor main body can be turned, and auxiliary link members by which turning of the link members relative to the base member is transmitted to the monitor main body.

The monitor device described in Patent Document 2 has a stand including a base section for supporting the lower surface of a monitor main body by contacting the lower surface, and two arm sections interposed between the back surface of the monitor main body and a back end portion of the base section. More specifically, the monitor device includes base hinge sections for interconnecting one-side end portions of the arm sections and a back portion of the base section so that the two arm sections can be turned relative to the base section, and monitor hinge sections for interconnecting other-side end portions of the arm sections and the back surface of the monitor main body so that the two arm sections can be turned relative to the monitor main body.

Patent Document 3 discloses a display device including a display section and arms 4 provided between the display section and a stand which supports the display section, wherein the arms 4 turnably support the display section at hinge sections 2a and 2b and turnably support the stand 3 at hinge sections 3a and 3b. In addition, it is disclosed in Patent Document 3 that ball casters are provided on the bottom surface of the stand for supporting the display section so as to permit the display section supported by the stand to be easily moved sliding on a mounting base such as a desk, and that braking means provided on the bottom surface of the stand can be actuated and canceled by operating a lever.

Meanwhile, display screens in recent years have come to be able to display images with high definition, and there are many cases where the viewer wants to view in detail the contents of the displayed images by bringing the viewer's face close to the display screen. In such a situation, generally, the viewer may lean forward so as to bring his or her face closer to the display screen of the display mounted on a desk.

In this case, when the display screen of the display is laid flat in a nearly horizontal state by use of a mechanism disclosed in Patent Documents 1 to 3, the viewer can peer into the display screen from above, so that the viewer can view in detail the images displayed on the display, while being seated on a chair and taking a natural posture.

According to the configurations of the monitor devices or display devices disclosed in Patent Documents 1 to 3, however, the hinge sections and the link members or arm sections are interposed between the back surface of the display and the base section or the stand, so that the height from the desk surface to the display screen would be comparatively large. This leads to the problem that the viewer's viewing operation or viewing posture in viewing the displayed images may become unnatural, thereby obstructing a long-time operation.

When a display supported by a stand can be easily moved sliding on a mounting base as in Patent Document 3, the display can be drawn closer the viewer's side, so that unnaturalness in the viewing operation or viewing posture for the user to view the displayed images can be lessened. Particularly, if the display supported by the stand with its display screen laid in a substantially horizontal state can be drawn closer to the user to a condition in which a lower end section of the display screen in an erected state (hereafter referred to as the lower end section of the display screen, for simplicity) protrudes from the desk surface, the unnaturalness in the viewing operation or viewing posture for the user to view the displayed images can be further reduced.

In Patent Documents 1 to 3, however, a mode of use in which the display supported on the stand is drawn closer to the user to such an extent that the lower end section of the display screen protrudes from the desk surface is not assumed; therefore, if such a mode of use were adopted, it would be impossible to support the display in a stable manner.

In Patent Document 1, therefore, since the monitor hinges for connection between the link members and the monitor main body are provided in the vicinity of a lower end section of the monitor main body, if the display screen is kept laid in a substantially horizontal state and the lower end section of the display screen is protruded from the desk surface, a part of the base section must necessarily also protrude from the desk surface, possibly leading to the monitor device falling from the desk. Thus, there is a safety problem.

Besides, in Patent Document 2 and Patent Document 3, the monitor main body or display connected to the base through arms is supported stably by realizing a condition wherein a lower end section of the monitor main body or display is engaged with the base section or stand. Also in the cases of Patent Document 2 and Patent Document 3, therefore, if the display screen is kept laid in a substantially horizontal state and the lower end section of the display screen is protruded from the desk surface, a part of the base section or stand would protrude from the desk surface, leading to a safety problem, as in the case of Patent Document 1.

In addition, recently, there have been known displays having a coordinate input device called a touch panel wherein a flat display panel and coordinate input means such as a touch sensor are combined with each other. In such a touch panel, a user's input operations onto the display screen should be taken into account, and it is important to stably support the touch panel, also at the time of performing an input operation onto the display screen.

Particularly, recent liquid crystal displays have been enlarged in size, and enlarged touch panels have come to be used accordingly. As an installation mode, at the time of input operations using a position indicator such as a pen (stylus) or a finger, a mode wherein the touch panel is used in the state of being laid in a nearly horizontal state is advantageous from the viewpoints of stability and ease of input operations, particularly in the cases of the above-mentioned enlarged touch panels.

In the cases of the stands disclosed in Patent Documents 1 to 3, however, the monitor hinges and the link members or arm sections are interposed between the back surface of the display and the base section, as mentioned above. Therefore, if the distance (height) from the desk surface to the display screen is enlarged, the problem of difficult input operations onto the touch panel would occur, like in the case of the viewing operation.

In addition, in the case of input operations on a screen at a position in an upper area on the large-type display screen, the distance from the operator to the screen position would be remote, so that the operator would have to perform the operation while leaning forward or taking a half-standing or standing posture. Therefore, a considerable burden is applied to the operator's body in the cases where such operations are frequent.

In view of this, if the touch panel can be operated in a state of being drawn closer to the operator, input operations at screen positions in an upper area on the display screen can be performed without need for the operator to lean forward or take a half-standing or standing posture. Thus, operation efficiency is enhanced, and the burden on the operator's body is alleviated.

In the configuration of the support stand for the monitor main body or display disclosed in Patent Documents 1 to 3, however, when the operator tries to operate the touch panel by drawing the touch panel closer to the operator and protruding the lower end section of the display from an end portion of the desk, the support state based on the stand would become unstable, possibly leading to a problem in input operations onto the touch panel.

BRIEF SUMMARY AND INITIAL DESCRIPTION

It is an aspect of the present disclosure to provide a display stand which makes it possible to change the installation mode of a display according to use and to stably support the display even in the case where a lower end section of a display screen is set protruding from an end portion of a desk.

In at least one embodiment of the present disclosure, there is provided a display stand including:

a base member having a pair of side surface sections, a front end section, and a back end section;

a pair of arm sections;

first hinge sections by which respective first end portions of the pair of arm sections are connected respectively to the pair of side surface sections of the base member so that the pair of arm sections can be turned relative to the base member; and second hinge sections by which second end portions of the pair of arm sections are connected to the display so that the display can be turned relative to the pair of arm sections, wherein the second hinge sections are connected to side surface sections of the display, wherein the arm length of the pair of arm sections is set such that when the second end portions of the pair of arm sections are turned in a first direction relative to the base member from the front end section toward the back end section of the base member, the display is put into a substantially upright state by rotation of the first hinge sections and the second hinge sections, and wherein when the second end portions of the pair of arm sections are turned in a second direction relative to the base member from the back end section toward the front end section of the base member, a back surface of the display makes contact with the base member without the pair of arm sections being interposed therebetween, and the position of contact of the back surface of the display with the base member is set between a lower end portion of the display and the positions of connection of the second hinge sections.

According to an embodiment of the present disclosure as described above, the first end portions of the pair of arm sections are turnably connected to the base member at the first hinge sections, and the second end portions of the pair of arm sections are turnably connected to the display at the second hinge sections. This ensures that the display can be supported by the base member through the pair of arm sections while regulating arbitrarily the inclination angle of the display screen of the display. Specifically, the user can easily change the use mode of the display to a mode in which the display screen of the display is set in an upright or nearly upright state, a mode in which the display screen is set in a nearly horizontal state, or in the state of being laid nearly flat.

When the second end portions of the pair of arm sections are turned in the direction from the back end section toward the front end section of the base member, a back surface part of the display located in the region between the second hinge sections and the lower end portion of the display makes contact with the base member, without the pair of arm sections being interposed therebetween. Consequently, turning the second end portions of the pair of arm sections toward the front section of the base member is restricted. Further, the display can be set into a state in which the lower end portion of the display protrudes outward beyond the front end section of the base member. Moreover, in the case where the second end portions of the pair of arm sections are turned in the direction from the back end section toward the front end section of the base member in order to protrude the lower end portion of the display outward beyond the front end section of the base member, the back surface part of the display comes into contact with the base member in the course of the turning, whereby further turning of the arm sections is inhibited. Therefore, in spite of the configuration in which the pair of arm sections are connected to respective side surface sections of the base member through the first hinge sections, further downward turning to such an extent that the second hinge sections come below the horizontal would not occur. Further, restriction of turning is realized without the pair of arm sections being interposed between the back surface part of the display and the base member. Therefore, it is possible to reduce the distance in the height (vertical) direction of the display screen when the lower end portion of the display is set protruding outward beyond the front end section of the base member.

Furthermore, even when the second end portions of the pair of arm sections are turned in the direction from the back end section toward the front end section of the base member so as to set the lower end portion of the display in a state protruding outward (toward the viewer's side) beyond the front end section of the base member, the positions in the horizontal direction of the second hinge sections as joints between the second end portions of the arm sections and the display are each located at a predetermined position between the front end section and the back end section of the base member. Specifically, the position of the center of gravity of the display in the horizontal direction in this situation is present at a predetermined position between the front end section and the back end section of the base member, so that the position of the center of gravity of the stand as a whole attached to the display is kept at a position between the front end section and the back end section of the base member.

Therefore, even when the lower end portion of the display is set protruding outward (toward the viewer's side) beyond the front end section of the base member, the stand as a whole to which the display is attached would not become unstable. Therefore, the user can use the display in the condition where the lower end portion of the display mounted to the stand is drawn closer to the user so as to protrude from a mounting base such as a desk.

According to the present disclosure, the inclination of the display screen of the display can be varied according to the use mode. In addition, a stable support condition can be maintained even when the display supported on the stand is drawn closer to the user to such an extent that the lower end portion of the display screen protrudes from the mounting base.

In addition, the back surface part of the display makes contact with the base member, without the pair of arm sections being interposed therebetween. Therefore, even in the case wherein, for example, the display is laid flat in a nearly horizontal state, the height from the upper surface of the mounting base to the display screen of the display is not increased due to interposition of the arm sections. Accordingly, the user can view the display screen of the display and perform input operations while taking a more natural posture. Thus, convenience in use can be secured.

BRIEF DESCRIPTION OF THE DRAWINGS

FIG. 1 is a side view of a display stand in a state of supporting a display thereon in accordance with aspects of the present disclosure;

FIG. 2 is a front view of the display stand in a state of supporting the display in accordance with aspects of the present disclosure;

FIG. 5 is an illustration of an example of the sensor unit in the touch panel of the example shown in FIG. 3 and a configuration example of a position detection circuit in the sensor unit;

DETAILED DESCRIPTION

Figure 3:
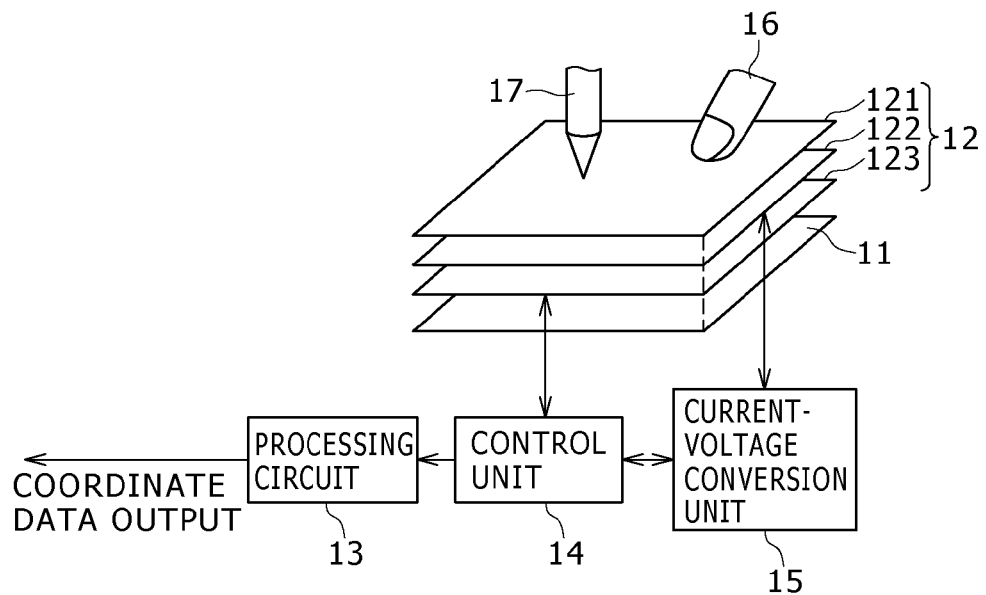
FIG. 3 is an illustration of an example of a touch panel as a display supported on an embodiment of the display stand.

Now, an embodiment of the display stand according to the present disclosure will be described below by taking as an example the case where a display includes a liquid crystal display of a comparatively large size, for example, a size in excess of 20 inches, which is mounted to a display stand, and by referring to the drawings. In this example, the display described below is configured as a touch panel having a sensor (coordinate input unit) for detection of coordinate indications given to a display screen by a pen (stylus), for example. Therefore, the example described below is configured as a coordinate input device including a display provided with a coordinate input unit and a stand according to an embodiment of the present disclosure.

FIG. 1 is a side view of a coordinate input device in accordance with aspects of the present disclosure, and FIG. 2 is a front view of the coordinate input device. The coordinate input device of this example includes a display 1, which is equipped with a position detecting sensor, and a stand 2. The stand 2 constitutes one embodiment of the display stand according to aspects of the present disclosure.

The stand 2 has a pair of arm sections 3L (FIG. 7) and 3R for supporting the display 1 on both the left and right sides, respectively, in a horizontal direction thereof, and a base member 4. A first end of each of the arm sections 3L and 3R are turnably connected to respective left and right side portions of the base member 4 through first hinge sections 5L (FIG. 7) and 5R, respectively. In addition, the display 1 is turnably connected to a second end in the longitudinal direction of the pair of arm sections 3L and 3R through second hinge sections 6L and 6R, respectively.

Exemplary displays 1 will now be described. The display 1 may include a liquid crystal display 11, and a sensor unit 12 as a coordinate input unit for detection of operation inputs to a display screen of the liquid crystal display 11. For example, the sensor unit 12 may be configured to detect position indication inputs made by position indicators, such as a finger and/or a pen, using two kinds of detection systems, as described in Japanese Patent Laid-open No. 2009-265759, for example.

Specifically, FIG. 3 illustrates the configuration of the position detection unit including the sensor unit 12 in accordance with at least one embodiment of the present disclosure. The position detection unit in this example has the sensor unit 12, a processing circuit 13, a control unit 14, and a current-voltage conversion unit 15.

The sensor unit 12 is laid on the display screen of the liquid crystal display 11. In the illustrated embodiment, the sensor unit 12 includes a cover 121 formed of an insulating material, a first detecting sensor unit 122 of a capacitive touch sensing system, and a second detecting sensor unit 123 of an electromagnetic induction system.

The control unit 14 is electrically connected to the first detecting sensor unit 122 through the current-voltage conversion unit 15, and detects a position indicated by coming into proximity or contact with the position indicator, such as a finger 16, by the capacitive touch sensing system. The control unit 14 is electrically connected to the second detecting sensor unit 123, and detects a position indicated by the position indicator such as a pen 17, by the electromagnetic induction system.

The processing circuit 13 is connected to the control unit 14 and is a circuit by which positions indicated by the position indicators, such as the finger 16 and the pen 17, detected by the control unit 14 are calculated as coordinate data on the sensor unit 12 and are outputted. Incidentally, in the illustrated embodiment, the first sensor unit 122 and the second sensor unit 123 are arranged on the liquid crystal display 11 so that the sensors constituting the detecting sensor units respectively have transparent electrodes.

Figure 4:
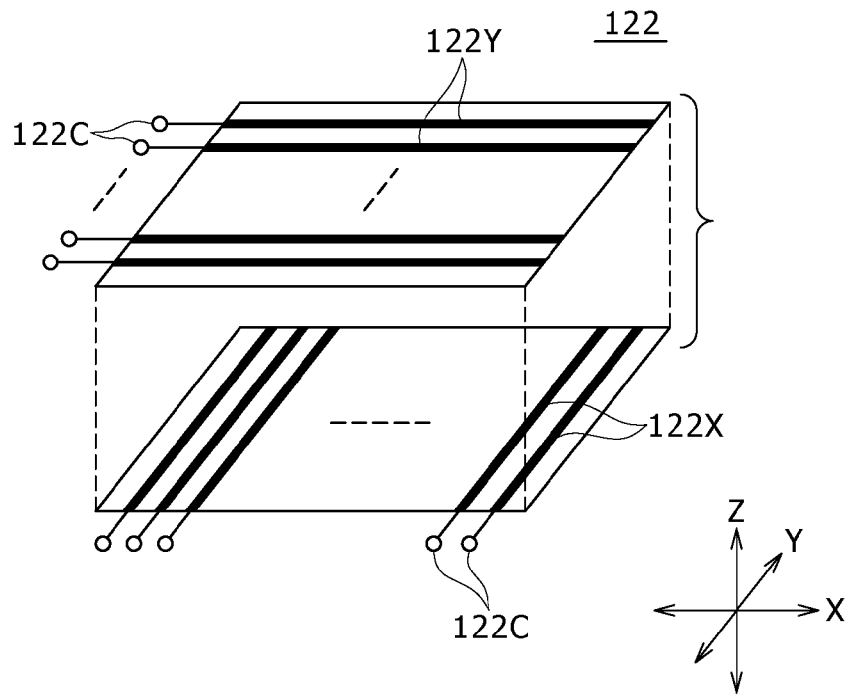
FIG. 4 is an illustration of an example of a sensor unit in the touch panel of the example shown in FIG. 3.

Detection of the position indicated by the position indicator by the capacitive touch sensing system using the first detecting sensor unit 122 will now be described. As shown in FIG. 4, the first detecting sensor unit 122 has a detection region for detecting an operation of a finger 16, and can detect a position in an X-axis direction (horizontal direction or row direction) and a Y-axis direction (vertical direction or column direction) which are orthogonal to each other. A plurality of rectilinear X-electrodes 122X extending along the Y-axis direction and a plurality of rectilinear Y-electrodes 122Y extending along the X-axis direction are arranged in the state of being electrically independent from each other and overlapping with each other in a Z-axis direction, which is orthogonal to both the X-axis direction and the Y-axis direction.

The plurality of X-electrodes 122X are disposed in parallel to each other, at a predetermined interval in the X-axis direction. Similarly, the plurality of Y-electrodes 122Y are arranged in parallel to each other, at a predetermined interval in the Y-axis direction. The plurality of X-electrodes 122X and the plurality of Y-electrodes 122Y are connected to the current-voltage conversion unit 15 through connection terminals 122C.

The control unit 14 supplies a predetermined current, such as high-frequency current, to the current-voltage conversion unit 15. The current-voltage conversion unit 15 converts the current received from the control unit 14 into a voltage and selectively impresses the voltage on the plurality of X-electrodes 122X or the plurality of Y-electrodes 122Y in a predetermined procedure.

In this condition, when for example a finger 16 comes into proximity to or contact with the first detecting sensor unit 122, the capacitance between the X-electrode 122X and the Y-electrode 122Y at the position of the coming into proximity or contact of the finger 16 is changed. The control unit 14 determines the X-electrode 122X and the Y-electrode 122Y between which the capacitance is changed by detecting the current change based on the change in the capacitance, through the current-voltage conversion unit 15, whereby the position of the coming into proximity or contact of the finger 16 is detected.

Now, the configuration of the detection circuit for detecting the position indicated by the position indicator by the electromagnetic induction system using the second detecting sensor unit 123 will be described, in reference to FIG. 5. As shown in FIG. 5, the pen 17 as the position indicator incorporates a resonance circuit composed of a coil 17L and a capacitor 17C connected in parallel to the coil 17L.

In the second detecting sensor unit 123, an X-axis direction loop coil group 123X and a Y-axis direction loop coil group 123Y are arranged in the state of overlapping with each other. Each of the loop coil groups 123X and 123Y includes a plurality of rectangular loop coils. The loop coils constituting the loop coil group 123X are arranged so as to sequentially overlap with one another while being arrayed at regular intervals in the horizontal or line direction (X-axis direction) of the detection region for detection of operation of the pen 17. The loop coils constituting the loop coil group 123Y are also arranged so as to sequentially overlap with one another while being arrayed at regular intervals in the vertical or column direction (Y-axis direction) of the detection region.

The control unit 14 includes a selection circuit 101, an oscillator 102, a current driver 103, a transmission-reception changeover circuit 104, a reception amplifier 105, a detection circuit 106, a low-pass filter 107, a sample hold circuit 108, an A/D (Analog-to-Digital) conversion circuit 109, and a processing control unit 110.

The X-axis direction loop coil group 123X and the Y-axis direction loop coil group 123Y are connected to the selection circuit 101. The selection circuit 101 sequentially selects loop coils in one of the two loop coil groups 123X and 123Y.

The oscillation circuit 102 generates an AC signal of a frequency f0. The AC signal is supplied to the current driver 103, where it is converted into a current, and the current is outputted to the transmission-reception changeover circuit 104. The transmission-reception changeover circuit 104, under the control of the processing control unit 110, changes over the connection destination (a transmission-side terminal T, a reception-side terminal R) to which the loop coil selected by the selection circuit 101 is connected. The current driver 103 is connected to the transmission-side terminal T, whereas the reception amplifier 105 is connected to the reception-side terminal R.

An induction voltage generated in the loop coil selected by the selection circuit 101 is supplied through the selection circuit 101 and the transmission-reception changeover circuit 104 to the reception amplifier 105, where it is amplified, before being outputted to the detection circuit 106.

The signal detected by the detection circuit 106 is supplied to the A/D conversion circuit 109 via the low-pass filter 107 and the sample hold circuit 108. The A/D conversion circuit 109 converts the analog signal to the digital signal and the supplies the digital signal to the processing control unit 110.

The processing control unit 110 performs a control for detection of position. Specifically, the processing control circuit 110 controls selection of a loop coil in the selection circuit 101, changeover control for signal in the transmission-reception changeover circuit 104, timing in the sample hold circuit 108, and so on. In addition, the processing control unit 110 controls energization of the X-axis direction loop coil group 123X or the Y-axis direction coil group 123Y, whereby an electromagnetic wave is outputted.

In each loop coil in the X-axis direction loop coil group 123X, and in the Y-axis direction loop coil group 123Y, an induction voltage is generated by an electromagnetic wave transmitted from the pen 17 provided as a position indicator. Based on the level of the voltage value of the induction voltage generated in each coil, the processing control unit 110 calculates the coordinate values of the indicated position in the X-axis direction and the Y-axis direction in a pen operation detection region of the second detecting sensor unit 123.

It is to be appreciated that the configuration of the sensor unit 12 as described above is merely an example, and, naturally, the above-described configuration is not limiting. For instance, a configuration of only a sensor unit of the electromagnetic induction system or a configuration of only a sensor unit of the capacitive touch sensing system may also be adopted. The indicator detection system also is not limited to the electrostatic system or the electromagnetic induction system. For example, a resistance film system may also be used.

As shown in FIGS. 1 and 2, the display 1 has the sensor unit 12, the liquid crystal display 11, a circuit component unit (printed wiring board) (not shown) and the like which are contained in a casing 1K. As shown in FIG. 2, a display screen 1D is disposed on a front surface 1a of the display 1, and a frame section (bezel) 1BZ is provided at the periphery of the display screen 1D. In areas on both left and right sides of the bezel 1BZ, there are provided operating units 18L and 18R, each of which includes function keys and a touch wheel for performing various processing operations, such as scroll and magnification/reduction of images displayed on the display screen 1D, changeover of layers, etc.

The casing 1K for containing the sensor unit 12 and the liquid crystal display 11 and the circuit component unit therein is formed only in a region corresponding to the display screen 1D, in this example. Specifically, as shown in FIG. 6, in the bezel 1BZ of the display 1, on the back side (the side of a back surface 1b of the display 1) on both left and right sides where the operating units 18L and 18R are provided, step sections 19L and 19R are formed respectively between the bezel 1BZ and the left and right side wall sections 1KL and 1KR of the casing 1K.

As will be described later, the second hinge sections 6L and 6R of the stand 2 as connection sections for connecting to the arm sections 3L and 3R are, in the illustrated embodiment, mounted to the left and right side wall sections 1KL and 1KR of the casing 1K of the display 1. The respective distances Dk from both left and right side ends of the bezel 1BZ are set such that, when the display 1 is viewed from the front surface 1a of the display 1, at least handles 613Ra, 613Rb, 613La, 613Lb described below of the second hinge sections 6L, 6R at least partly protrude from end portions of the bezel 1BZ to be visible, and other portions are invisible because they are hidden behind the bezel 1BZ.

Figure 7:
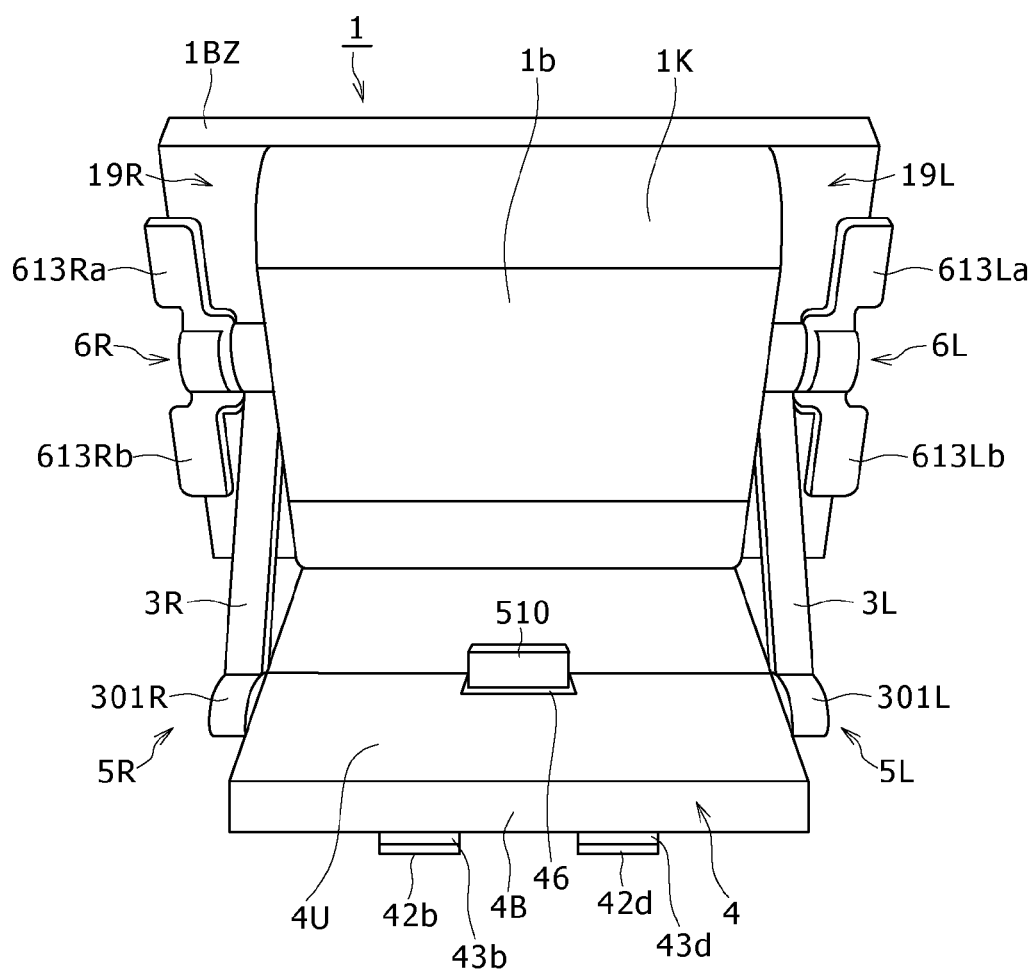
FIG. 7 is a back isometric view of the display stand in a state of supporting a display thereon in accordance with aspects of the present disclosure.

FIG. 7 is a view from the back surface 1b side of the display 1 in which the display 1 is mounted to the base member 4 through the arm sections 3L, 3R. The second hinge sections 6L, 6R are provided at the step sections 19L, 19R, and the arm sections 3L, 3R are also located inside of the step sections 19L, 19R. The second hinge sections 6L, 6R are structured such that they are engaged respectively with the side wall sections 1KL, 1KR (FIG. 1) of the display 1 but are not engaged with the back surface 1b of the display 1. Therefore, when the display 1 is turned relative to the arm sections 3L, 3R, the arm sections 3L, 3R are constantly located at the step sections 19L, 19R so that the casing 1K does not obstruct the turning of the display 1 relative to the arm sections 3L, 3R. In addition, when the arm sections 3L, 3R are turned relative to the base member 4, the arm sections 3L, 3R are not present between the base member 4 and the back surface of the display 1, or the back surface 1b of the casing 1K. Accordingly, when the display 1 is inclined such that its display surface becomes substantially parallel to the mounting surface for the stand 2, and the arm sections 3L, 3R are turned in the direction from a back end section 4B (FIG. 1) toward a front end section 4F (FIG. 1) of the stand 2, the display 1 can be brought closer to the mounting surface for the stand 2, since the arm sections 3L, 3R are not interposed between the back surface 1b of the casing 1K and the base member 4. Consequently, the display 1 can be brought closer to the mounting surface for the stand 2.

Figure 6:
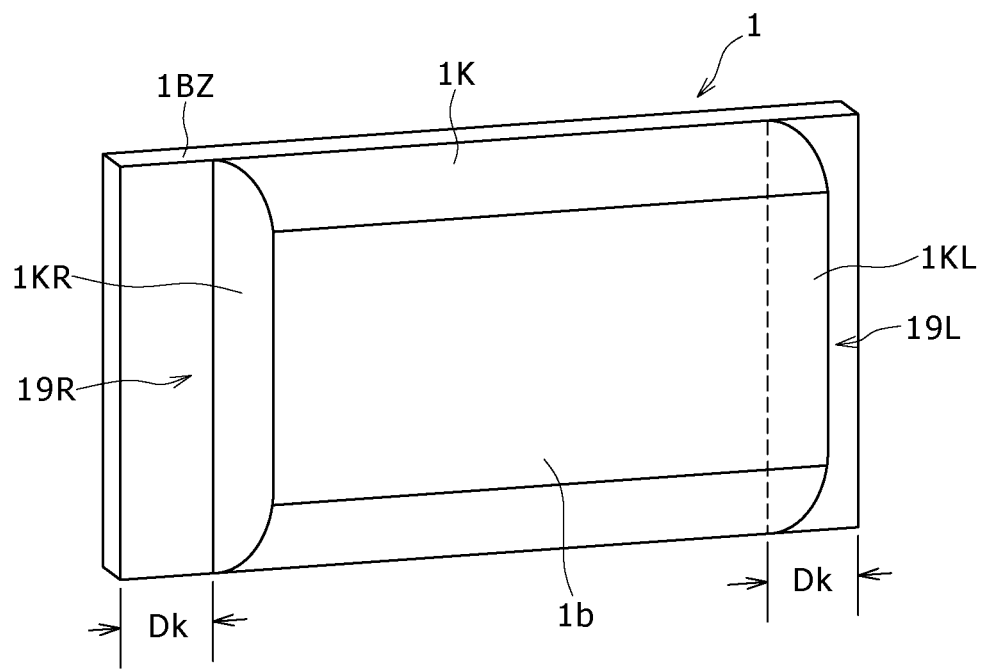
FIG. 6 is a back view of an example of a display in accordance with aspects of the present disclosure.
Figure 8:
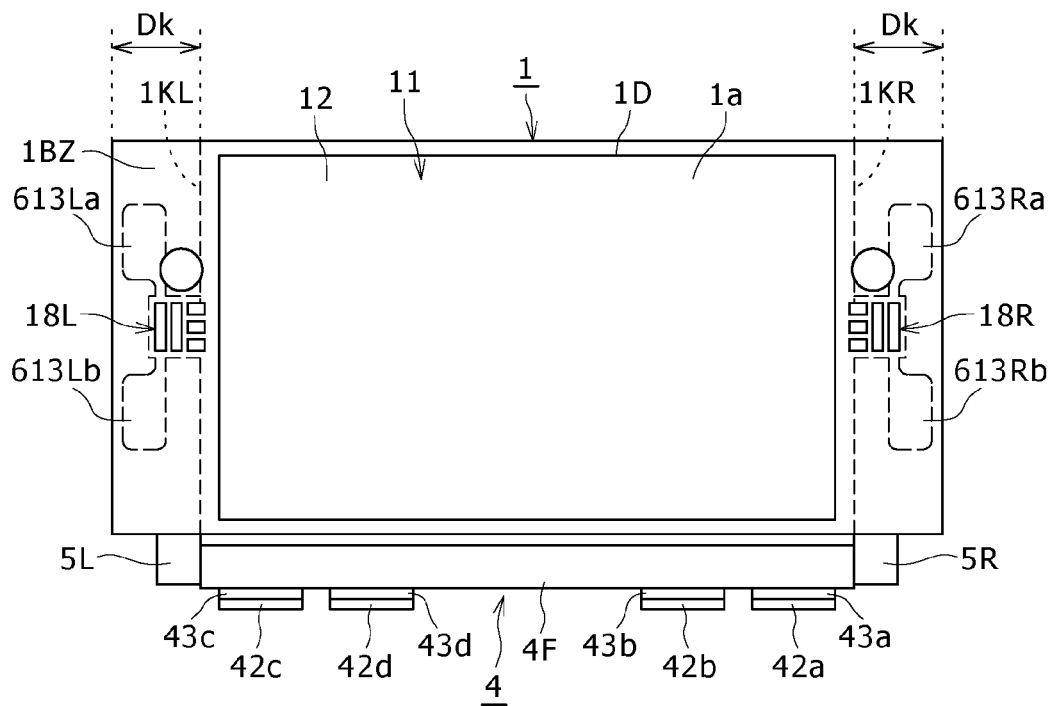
FIG. 8 is a front view of another display stand in a state of supporting a display thereon in accordance with aspects of the present disclosure.

As above-mentioned, in the illustrated embodiments shown in FIGS. 2, 6, and 7, the respective distances Dk from side portions of the bezel 1BZ to the side wall sections 1KL, 1KR of the casing 1K are set to such lengths that the handles 613Ra, 613Rb, 613La, 613Lb of the second hinge sections 6L, 6R are partly visible. Alternatively, as shown in FIG. 8, the distances Dk may also be set to such lengths that the handles 613Ra, 613Rb, 613La, 613Lb do not protrude from the side portions of the bezel 1BZ and, therefore, they are invisible when viewed from the front. In this case, the handles 613Ra, 613Rb, 613La, 613Lb do not protrude from the side portions of the bezel 1BZ, so that it is possible to enhance the degree of freedom in setting the display 1 in a place narrow in width. It is to be appreciated that while the illustrated embodiment includes the step sections 19L, 19R as shown in FIGS. 2, 6, 7 and 8, in another embodiment, a display 1 may not include the step sections 19L, 19R. Furthermore, in the example shown in FIGS. 2, 6 and 7, the side wall sections 1KL, 1KR are formed with the step sections, which each extend from an upper end portion to a lower end portion of the display 1. However, the shape of the side wall sections 1KL, 1KR may be any surface shape that allows the second hinge sections 6L, 6R to be disposed thereby and does not obstruct the turning of the arm sections 3L, 3R. Therefore, the side wall sections 1KL, 1KR may be respectively provided with spaces in which the second hinge sections 6L, 6R can be disposed and the arm sections 3L, 3R can be contained either partly or wholly.

In the display 1 in these examples, the position of the center of gravity in the direction from a lower end portion toward an upper end portion of the display 1, or in a vertical direction, is set at a central position or a roughly central position between the lower end portion and the upper end portion so that the display 1 can be turned by a similar force irrespectively of the direction in which the display 1 is turned. In addition, in this example, the position in the lateral direction of the center of gravity of the display 1 is set at a roughly central position between a left-side end portion and a right-side end portion.

An exemplary stand 2 as illustrated in FIG. 1 will now be described. As mentioned above, the stand 2 includes a pair of arm sections 3L, 3R and a base member 4. The pair of arm sections 3L, 3R can support the comparatively heavy display 1. In one embodiment, the arm sections 3L, 3R can support a display 1 having a screen size of 21 inches or more, in this example, at left and right side portions in the lateral direction of the display 1. In some embodiments, the pair of arm sections 3L, 3R is formed from a high-rigidity material, such as aluminum or synthetic resin, and the casing of the base member 4 is made from synthetic resin. In the illustrated embodiment, the casing of the base member 4 has a roughly rectangular parallelepiped external appearance with a comparatively small thickness, and includes a pair of side surface sections 4SL, 4SR, the front end section 4F, and the back end section 4B. In this example, when the display 1 is mounted to the stand 2, the front end section 4F of the base member 4 is located on the side of the user who views the display screen 1D.

As is best shown in FIGS. 1 and 7, first end portions of the pair of arm sections 3L and 3R are connected to the base member 4 through respective first hinge sections 5L and 5R at the pair of side surface sections 4SL and 4SR of the base member 4, in such a manner that allows the arm sections 3L and 3R to be turned relative to the base member 4. In one embodiment, each of the first hinge sections 5L and 5R is connected to the base member 4 at a position deviated toward the back end section 4B of the base member 4, relative to a central position in the direction from the front end section 4F toward the back end section 4B of the base member 4.

The second end portions of the pair of arm sections 3L and 3R are connected to the display 1 through respective second hinge sections 6L and 6R at the step sections 19L and 19R on both left and right side on the back side of the display 1. In this manner, the display 1 can be turned relative to the arm sections 3L and 3R; in this case, a straight line segment interconnecting the pair of second hinge sections 6L and 6R of the display 1 serves as a center axis of turning of the display 1.

In one embodiment, the second hinge sections 6L and 6R are each disposed at a predetermined position of a side portion of the display 1, which may correspond to the position of the center of gravity of the display 1 between the lower end portion and the upper end portion of the display 1. In this embodiment, the center of gravity of the display 1 is located at the central position in the direction from the lower end portion toward the upper end portion of the display 1, or in the vertical direction; therefore, the second hinge sections 6L and 6R are disposed at positions which are respectively in the regions of the step sections 19L and 19R on the back side of the left and right side portions of the bezel 1BZ of the display 1 and which are each located roughly at the center between the lower end portion and the upper end portion of the display 1.

In one embodiment, the base member 4 may be structured such that it is thicker on the side proximate the back end section 4B than on the side proximate the front end section 4F and, therefore, the center of gravity of the base member 4 in the direction from the front end section 4F toward the back end section 4B is located at a position deviated toward the back end section 4B in relation to the central position in the direction. For instance, the thickness of the base member 4 ranging from the positions of arrangement of the first hinge sections 5L, 5R to the back end section 4B may be greater than the thickness of the member 4 ranging from the positions of arrangement of the first hinge sections 5L, 5R to the front end section 4F. Furthermore, in one embodiment, a weight 44, such as a weight formed of a high-specific-gravity material, such as a metal, e.g., iron, is disposed at the thicker part on the back end section 4B side, thereby causing the center of gravity of the base member 4 to be further deviated toward the back end side of the base member 4. The weight 44 may be set such that the weight of the base member 4 is equal to or greater than the weight of the display 1. In one embodiment, the weight of the base member 4 is set to be two times greater than the weight of the display 1.

Figure 9:
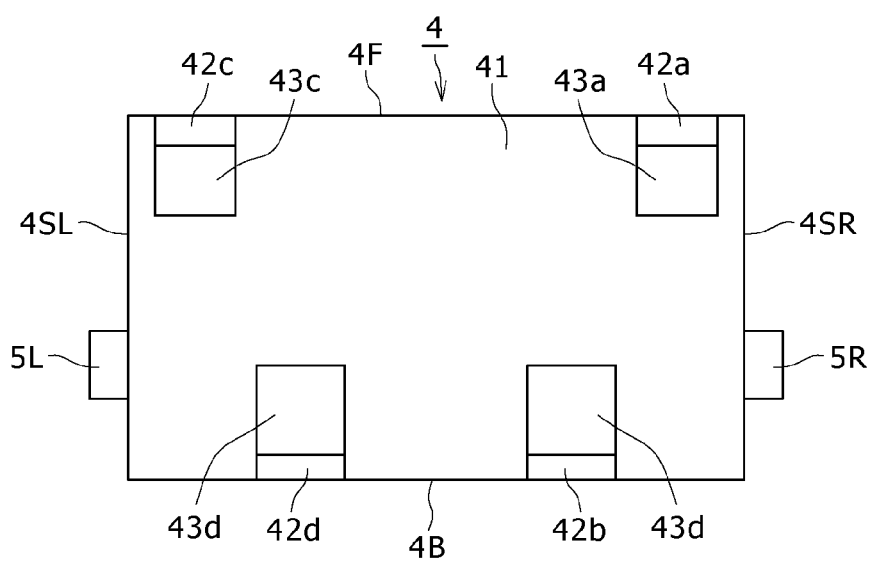
FIG. 9 is a bottom view of a base member of a display stand in accordance with aspects of the present disclosure.

Turning now to FIG. 9, there is shown a view of the base member 4 as viewed from the bottom surface 41 side. As is shown in FIG. 9, the base member 4 has a bottom surface 41 which is substantially flat in shape. In the illustrated embodiment, the bottom surface 41 further includes a plurality of (in this example, four) leg members (base members) 42a, 42b, 42c, 42d and braking (or damping) members 43a, 43b, 43c, 43d. In the illustrated embodiment, the four leg members 42a, 42b, 42c, 42d and braking members 43a, 43b, 43c, 43d are disposed so as to overlap with each other, respectively.

When the stand 2 is statically disposed on a mounting base, such as a desk, the leg members 42a, 42b, 42c, 42d are in contact with the mounting base. On the other hand, if the stand 2 should unexpectedly move across the mounting base to an arbitrary position, the movement would be stopped by the braking members 43a, 43b, 43c, 43d. Therefore, the braking members 43a, 43b, 43c, 43d are formed from a material which, when in contact with the mounting base, can brake sliding movement of the base member 4 on the mounting base, owing to frictional forces between the mounting base and the braking members 43a, 43b, 43c, 43d. In one embodiment, the braking members 43a, 43b, 43c, 43d are elastic members such as rubber members which, as shown in FIG. 1, have a thickness of hb and may be, for example, rectangular in shape.

As shown in FIG. 9, the braking members 43a, 43b, 43c, 43d are greater in area than the leg members 42a, 42b, 42c, 42d, and may be attached to the bottom surface 41 of the base member 4 by, for example, an adhesive, a fastener, or the like. In the illustrated embodiment in FIG. 9, the braking members 43a and 43c are each so disposed that one edge of the rectangular shape thereof roughly coincides with the front end section 4F, like the leg members 42a and 42c; similarly, the braking members 43b and 43d are each so disposed that one edge of the rectangular shape thereof roughly coincides with the back end section 4b, like the leg members 42b and 42d.

In addition, the rectangular sheet-like leg members 42a, 42b, 42c, 42d may be smaller in area than the braking members 43a, 43b, 43c, 43d and may be adhered to the braking members 43a, 43b, 43c, 43d by an adhesive, a fastener, or the like. Consequently, as shown in FIGS. 1 and 9, of the braking members 43a, 43b, 43c, 43d, other portions than the portions disposed overlapping with the leg members 42a, 42b, 42c, 42d are exposed.

The material for the leg members 42a, 42b, 42c, 42d may be selected such that the stand 2 when mounted on an installation or mounting base, such as a desk, can be moved or slide when a force of not less than a predetermined value is exerted on the stand 2. In one embodiment, the leg members 42a, 42b, 42c, 42d are formed from a material, such as resin, which causes a comparatively small frictional force to be generated at the parts in contact with the mounting base. Incidentally, the surface shape, roughness, or the like, of the parts of the leg members 42a, 42b, 42c, 42d in contact with the mounting base may be selected so as to reduce the frictional force between the mounting base and these parts.

Further, in the embodiment in which the leg members 42a, 42b, 42c, 42d and the braking members 43a, 43b, 43c, 43d are set overlapping with each other has been shown as an example above, it is to be understood the overlapping arrangement is not required. In one embodiment, the leg members 42a, 42b, 42c, 42d and the braking members 43a, 43b, 43c, 43d may be attached to the bottom surface 41 of the base member 4 independently from each other. In such an embodiment, it is to be appreciated that the height ha from the bottom surface 41 of the base member 4 to the plane of contact of the leg members 43a, 43b, 43c, 43d with the mounting base is greater than the thickness hb of the braking members 43a, 43b, 43c, 43d, as shown in FIG. 1. This configuration ensures that, when all the leg members 42a, 42b, 42c, 42d on the bottom surface 41 of the base member 4 are present on a mounting base, the braking members 43a, 43b, 43c, 43d are out of contact with the upper surface of the mounting base, so that the user can move the stand 2 through sliding comparatively easily, by pushing or pulling the stand 2 placed on the mounting base. When at least one of the leg members 42a, 42b, 42c, 42d is protruding from the mounting base, however, at least one of the braking members 43a, 43b, 43c, 43d on the bottom surface of the base member 4 makes contact with the mounting base. In this condition, the frictional force between the mounting base and at least one of the braking members 43a, 43b, 43c, 43d prevents the stand 2 from sliding off of the mounting base.

In some embodiments, the leg members having the height ha may be formed integrally with the base member 4, or may be fixed to the bottom surface 41 of the base member 4 by adhesion, fasteners, or the like.

In addition, although the leg members and the braking members in the illustrated embodiment are rectangular shaped, other shapes, such as a cylindrical shape, may be adopted for the leg members and/or the braking members. Furthermore, the number of the leg and/or braking members may be any number and thus is not restricted to four as illustrated. For example, the braking member having the thickness hb may be disposed over the whole part of the bottom surface 41. Incidentally, those positions on the bottom surface 41 of the base member 4 at which the braking members should be present are selected so as to ensure that when at least one of the leg members comes to protrude from the mounting base during sliding movement of the stand 2 (base member 4) on the mounting base in a direction parallel to the bottom surface 41, the braking member comes into contact with the mounting base.

Exemplary first hinge sections will now be described. As mentioned above, the arm sections 3R and 3L of the stand 2 are connected to the side surface sections of the base member 4 through the first hinge sections 5R and 5L, in such a manner that they can each be turned in the direction from a back end section toward a front end section of the base member 4 or in the direction from the front end section toward the back end section of the base member 4.

Figure 10A:
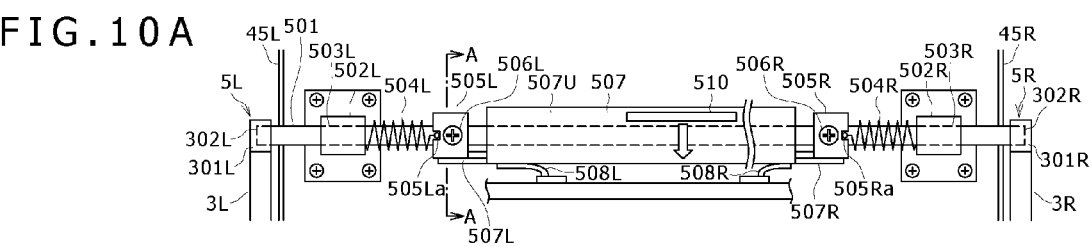
FIGS. 10A to 10C are cross-section views of a first hinge section in accordance with aspects of the present disclosure.
Figure 10B:
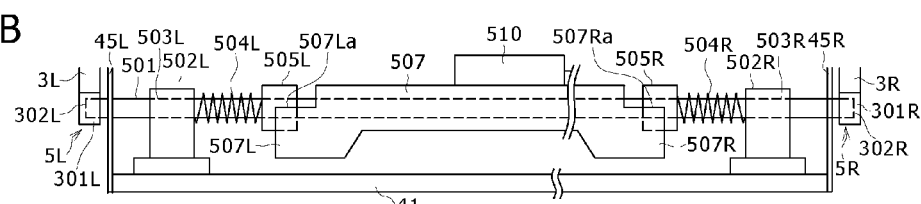
Figure 10C:
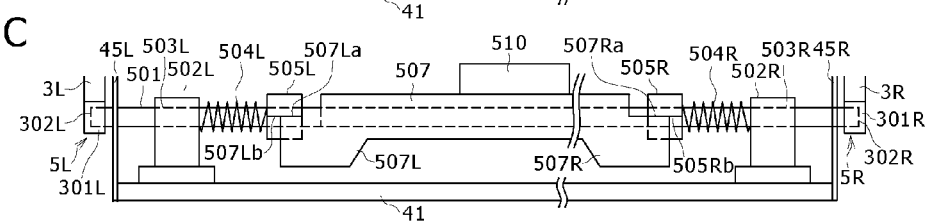

Referring now to FIGS. 10A to 10C, there are shown illustrations of the first hinge sections 5R and 5L for turnably interconnecting respective first end portions of the arm sections 3R and 3L to the base member 4. FIGS. 10A to 10C illustrate a condition where the upper and side surfaces of the casing of the base member 4 have been removed. FIG. 10A is a view of the parts of the hinge sections 5R and 5L in accordance with one embodiment of the present disclosure, as viewed from the upper surface side of the base member 4. FIGS. 10B and 10C are views of the parts of the hinge sections 5R and 5L, as viewed from the front side of the base member 4. It is to be appreciated that the first hinge section may be any hinge that allows the arm sections 3R and 3L to move relative to the base member 4.

In the illustrated embodiment, the base member 4 is provided with a rotating shaft 501 which may include a cylindrical rod-like body extending in a direction substantially parallel to the bottom surface 41, while penetrating the left and right side walls 45L and 45R of the casing thereof. The respective first end portions of the arm sections 3L and 3R are fitted and attached to end portions of the rotating shaft 501, which are protruding to the outside respectively from the left and right side walls 45L and 45R.

To be more specific, the respective first end portions of the arm sections 3L, 3R are formed with connection members 301L, 301R, which include fitting recesses 302L, 302R in which to fit the end portions of the rotating shaft 501. One end portion and the other end portion of the rotating shaft 501 are fitted respectively into the fitting recesses 302L, 302R of the connection members 301L, 301R, and are fixed in situ by press fit, adhesive, fasteners, or the like. As a result, each of the arm sections 3L, 3R is fixed to the rotating shaft 501 on the one end side thereof, whereby it is connected to the base member 4. In the connected state, the respective longitudinal directions of the arm sections 3L, 3R are orthogonal to the center axis direction of the rotating shaft 501. In addition, the arm section 3L and the arm section 3R are fixed to the rotating shaft 501 in a torsionlessly opposed state so that a flat plane is formed by the arm sections 3L, 3R and the rotating shaft 501.

Shaft support sections 502L and 502R are provided proximate the left and right side walls 45L and 45R of a bottom portion in the casing of the base member 4. The shaft support sections 502L and 502R include through-holes 503L and 503R having an inside diameter slightly greater than the diameter of the rotating shaft 501. The rotating shaft 501 penetrates the through-holes 503L and 503R and is turnably supported by the shaft support sections 502L and 502R.

Coil springs 504L and 504R are passed over the rotating shaft 501, and a respective first end of the coil springs 504L and 504R are fixed to the sides of the shaft support sections 502L and 502R. In addition, annular members 505L and 505R are passed over the rotating shaft 501 in such a state that the coil springs 504L and 504R are clamped between the shaft support sections 502L, 502R and the annular members 505L, 505R, respectively. The annular members 505L and 505R are fixed to the rotating shaft 501 by respective fixing screws 506L and 506R so that they are not turned relative to the rotating shaft 501. The second end of the coil springs 504L and 504R are inserted and fixed in recessed grooves 505La and 505Ra which are formed in the annular members 505L and 505R, respectively.

In this manner, the respective first and second ends of the coil springs 504L and 504R are fixed to the sides of the shaft support sections 502L and 502R and to the annular members 505L and 505R. Therefore, by respective elastic restoring forces (to torsion) of the coil springs 504L and 504R, the arm sections 3L and 3R are biased in a direction for rotation about the rotating shaft 501 and which, in one embodiment, is oriented from the back end section 4B toward the front end section 4F of the base member 4 (see arrow 30a in FIG. 11).

Figure 11:
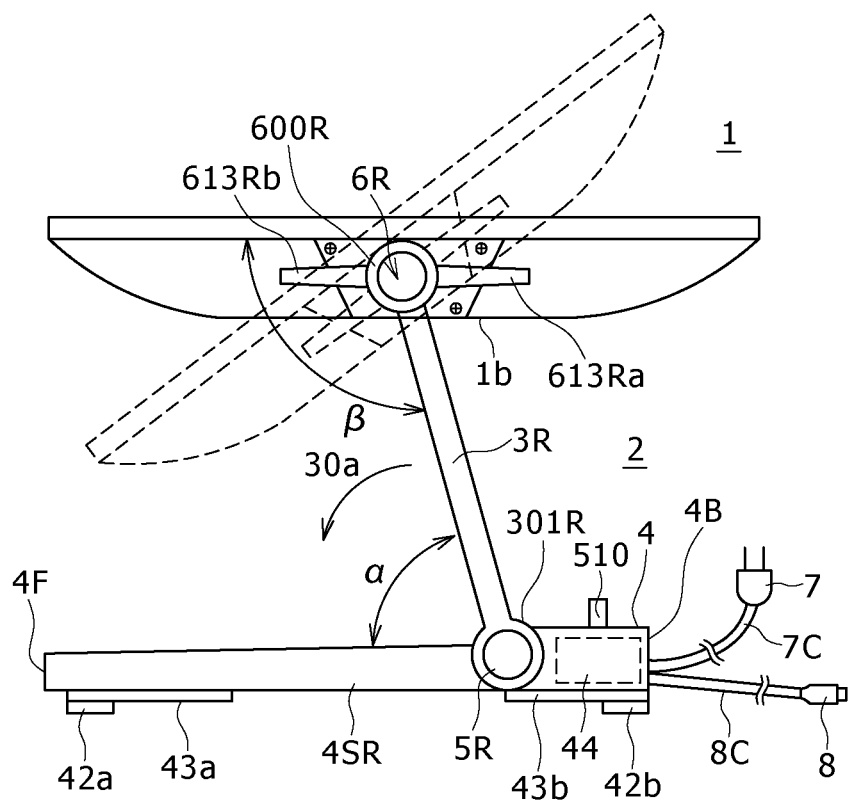
FIG. 11 is a side view of one embodiment of the display stand in accordance with aspects of the present disclosure, in a state of supporting a display thereon.

In at least one embodiment, each of the arm sections 3L and 3R is provided with a locking mechanism by which the arm section 3L, 3R can be locked in a state as shown in FIG. 11. For instance, in one embodiment, the angle α between the longitudinal direction of the arm section 3L, 3R and the upper surface of the base member 4 may be locked at a predetermined angle, for example, at about 70 degrees.

Figure 12A:
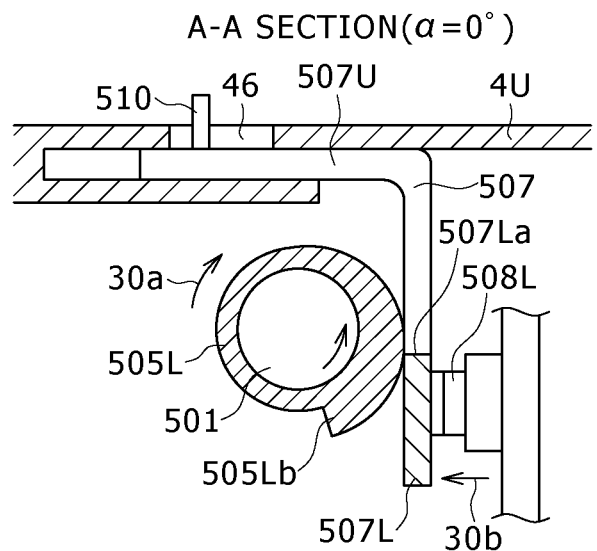
FIGS. 12A and 12B are cross-section views of the first hinge section in FIG. 10A taken along line A-A in accordance with aspects of the present disclosure.
Figure 12B:
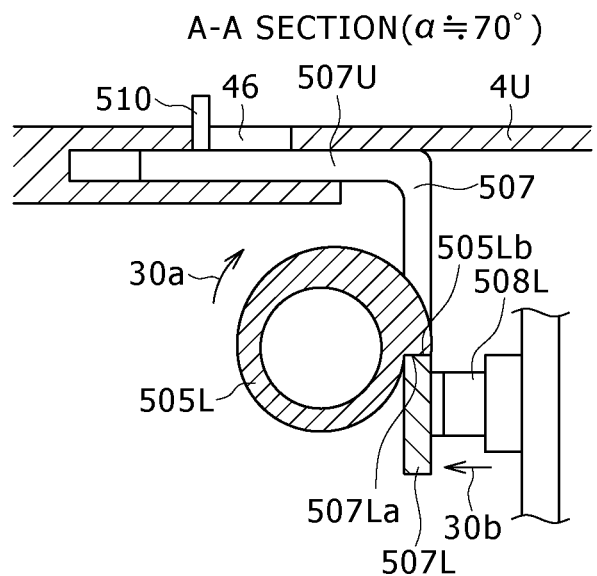

The locking mechanism will be described referring also to FIGS. 12A and 12B, which are cross-sectional views taken along line A-A of FIG. 10A. FIG. 12A shows a condition where the angle α is, for example, 0 degrees, and FIG. 12B shows a condition where the angle α is, for example, about 70 degrees. While FIGS. 12A and 12B are cross-sectional views on the side of the annular member 505L, it is to be appreciated that the same configuration may also be adopted on the side of the annular member 505R.

The locking mechanism in the illustrated embodiment includes the annular members 505L and 505R, and a stopper member 507. As shown in FIGS. 12A and 12B, the stopper member 507 includes a plate-like body, which may be L-shaped in cross-section. In addition, as is best shown in FIGS. 12A and 12B, the stopper member 507 has abutment plate sections 507L and 507R coming into abutment on peripheral side surfaces of the annular members 505L and 505R. The abutment plate sections 507L and 507R of the stopper member 507 are constantly put in abutment on the peripheral side surfaces of the annular members 505L and 505R by leaf spring members 508L and 508R in the state of being elastically biased in the direction of arrow 30b in FIGS. 12A and 12B.

The peripheral side surfaces of the annular members 505L and 505R are formed with stepped sections 505Lb and 505Rb, as shown in FIGS. 12A and 12B. When the above-mentioned angle α becomes a predetermined angle, such as α≈70 as shown in FIG. 12B, the stepped sections 505Lb and 505Rb are engaged with upper end surfaces 507La and 507Ra of the abutment plate sections 507L and 507R of the stopper member 507.

As has been described above, a biasing force in a rotating direction of arrow 30a is constantly exerted on the rotating shaft 501, as shown in FIGS. 1, 11, 12A and 12B. Therefore, the same biasing force is exerted also on each of the annular members 505L and 505R fixed to the rotating shaft 501. Therefore, when the stepped sections 505Lb and 505Rb of the annular members 505L and 505R are engaged with the upper end surfaces 507La and 507Ra of the abutment plate sections 507L and 507R of the stopper member 507, turning of the arm sections 3L and 3R about the rotating shaft 501 is locked, irrespectively of the rotating biasing force in the direction of arrow 30a. In other words, the arm sections 3L and 3R are locked in the state in which angle α≈70 degrees.

Of the stopper member 507, a plate section 507U extending in a direction orthogonal to the abutment plate sections 507L and 507R is provided with a canceling lever member 510, as shown in FIGS. 10A to 10C and FIGS. 12A and 12B. The canceling lever member 510 is formed on the plate section 507U as a projected section having a predetermined length, and is formed to protrude from the upper surface 4U of the casing of the base member 4 through a through-hole 46 bored in the upper surface 4U, as shown in FIGS. 7, 12A, and 12B.

When the user moves the canceling lever member 510 in the direction of the arrow in FIG. 10A in the condition where the arm sections 3L and 3R are locked, such as in the state of the angle α≈70 degrees, the engagement between the stepped sections 505Lb, 505Rb of the peripheral side surfaces of the annular members 505L, 505R and the upper end edges 507La, 507Ra of the abutment plate sections 507L, 507R is canceled. This results in that, since the rotational biasing force in the direction of the arrow 30a in FIGS. 12A and 12B is exerted on the rotating shaft 501, the relationship between the annular members 505L, 505R and the stopper member 507 transits from the state of FIG. 12B to the state of FIG. 12A, whereby the arm sections 3L and 3R are returned into a freely turnable state.

When the above-mentioned angle is in the range of 0<α<70, the abutment plate sections 507L and 507R of the stopper member 507 are not engaged with the stepped sections 505Lb and 505Rb of the peripheral side surfaces of the annular members 505L and 505R, so that the arm sections 3L and 3R are in the freely turnable state.

Exemplary second hinge sections will now be described. As has been described above, the respective second end portions of the arm sections 3R, 3L of the stand 2 are connected to the display 1 through the second hinge sections 6R, 6L. Thus, the hinge section 6R and the hinge section 6L ensure that the display 1 can be turned about a second rotating axis in the direction of interconnecting the second hinge sections 6R and 6L, in relation to the second end portions of the arm sections 3R and 3L.

Figure 13:
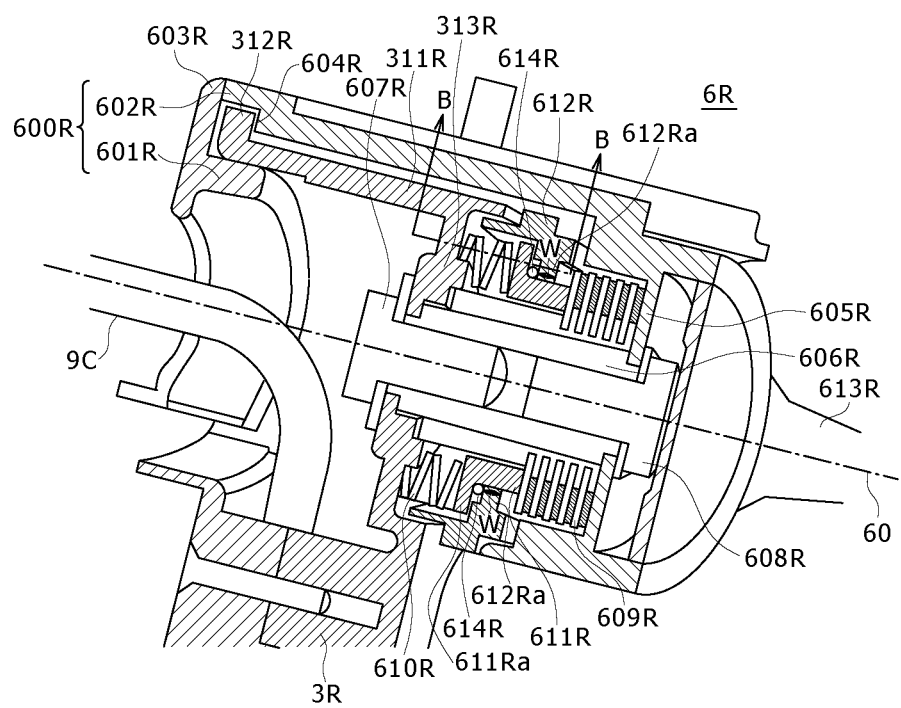
FIG. 13 is a cross-section view of a second hinge section of the display stand in accordance with aspects of the present disclosure.

It is to be appreciated that the structures of the second hinge sections 6R and 6L are quite the same, except that they are in left-right symmetry; therefore, only the structure of the second hinge section 6R will be described here in detail. FIG. 13 is an illustration of the detailed structure of the second hinge section 6R in accordance with at least one embodiment of the present disclosure, and is a view showing a section taken along a plane containing the center line (hereafter referred to as axis line) 60 (the dot-dash line in FIG. 13) of the axis of rotation of the display 1 relative to the arm sections 3R and 3L. It is to be appreciated, however, that the second hinge section may be any hinge that allows the display 1 to rotate relative to the arm sections 3R and 3L.

The second end portion of the arm section 3R is formed with a cylindrical connection section 311R of which the center line position coincides with the axis line 60. The cylindrical connection section 311R is provided, at its opening end edge on the display 1 side, with a flange section 312R protruding outward from an outer peripheral side surface of the cylindrical connection section 311R.

At the step section 19R of a right side part of the display 1, a housing member 600R is attached to a side wall section 1KR (not shown in FIG. 13) of the casing 1K by, for example, fasteners or the like. The housing member 600R includes an inside housing member 601R and an outside housing member 602R. The inside housing member 601R has a cylindrical member having a center line position coinciding with the axis line 60 and having an outside diameter slightly smaller than the inside diameter of the cylindrical connection section 311R of the arm section 3R. In addition, the outside housing member 602R has a cylindrical member having a center line position coinciding with the axis line 60, and having an inside diameter slightly greater than the outside diameter of the cylindrical connection section 311R of the arm section 3R. It should be noted here that respective side peripheral surfaces of the cylindrical members constituting the inside housing member 601R and the outside housing member 602R are each provided with an opening (not shown) for connection with the arm section 3R and for permitting the display 1 to be turned about the axis line 60 in relation to the second end portion of the arm section 3R.

In addition, the inside housing member 601R is provided, at its end edge on the display 1 side, with a flange section 603R for abutting on and connection to an end edge, on the display 1 side, of the outside housing member 602R. The outside housing member 602R is provided, on an inner wall surface in the vicinity of its end edge on the display 1 side, with a stepped section 604R for loose engagement with the flange section 312R of the cylindrical connection section 311R of the arm section 3R. Further, the inside housing member 601R and the outside housing member 602R are combined with each other so that the center lines of the cylindrical members respectively constituting them coincide with the axis line 60, thereby constituting the housing member 600R.

The cylindrical connection member 311R of the arm section 3R is contained in the housing member 600R in a state wherein its flange section 312R is located in a space defined by the flange section 603R of the inside housing member 601R and the end edge and the stepped section 604R of the outside housing member 602R. In this case, the center line of the cylindrical connection member 311R of the arm section 3R is also set to coincide with the axis line 60. This ensures that the housing member 600R is connected to the cylindrical connection member 311R of the arm section 3R, in the state of being turnable about the axis line 60 in relation to the cylindrical connection member 311R. In this case, the cylindrical connection member 311R of the arm section 3R, in its state of being contained in the housing member 600R, has its flange section 312R engaged with the stepped section 604R of the outside housing member 602R, so that it would not be disengaged from the housing member 600R.

The cylindrical connection member 311R of the arm section 3R is formed, on the opposite side to the display 1 side, with a circular plate section 313R which is provided with a connection hole in a central portion thereof. In addition, the outside housing member 602R is provided, on the opposite side to the display 1 side, with a circular plate section 605R which is similarly provided with a connection hole in a central portion thereof. In this case, the circular plate section 605R is located at a predetermined distance from the circular plate section 313R of the arm section 3R.

A clutch shaft 606R is provided between the circular plate section 313R of the arm section 3R and the circular plate section 605R of the outside housing member 602R in such a manner that the clutch shaft 606R center line coincides with the axis line 60. Further, the circular plate section 313R of the arm section 3R is secured to the clutch shaft 606R, such as by a screw 607R, and the circular plate section 605R of the outside housing member 602R is secured to the clutch shaft 606R, such as by a screw 608R.

The clutch shaft 606R has a double-tubular structure, and is provided with ring washers 609R on an outside tubular section thereof. While the circular plate section 313R and the circular plate section 605R are thus screwed to the clutch shaft 606R, it is ensured that, under this screwing alone, the housing member 600R can be turned about the axis line 60 in relation to the cylindrical connection member 311R of the arm section 3R. When the ring washers 609R are firmly biased to the circular plate section 605R side, the housing member 600R cannot be turned relative to the arm section 3R.

In this embodiment, a control mechanism by which a locked state for stopping turning of the housing member 600R relative to the cylindrical connection member 311R of the arm section 3R can be realized and by which return from the locked state to the turnable state is realized at an outer peripheral part of the clutch shaft 606R.

More specifically, in the example shown in FIG. 13, the ring washers 609R, a spring washer 610R, and a sliding member 611R are provided between the circular plate section 605R of the outside housing member 602R and the circular plate section 313R of the cylindrical connection member 311R of the arm section 3R.

The sliding member 611R is an annular member having a flange section 611Ra, and is slidable in the direction along the axis line 60 in relation to the clutch shaft 606R. The spring washer 610R is provided between the flange section 611Ra of the sliding member 611R and the circular plate section 313R of the arm section 3R. In addition, the ring washers 609R are provided between the opposite side to the flange section 611Ra side of the sliding member 611R and the circular plate section 605R of the outside housing member 602R. Therefore, the sliding member 611R is put in the state of normally being elastically biased to the side of the ring washers 609R by the spring washer 610R.

The spring washer 610R is designed to have a comparatively large elastic biasing force such that its elastic biasing force moves the sliding member 611R sliding toward the ring washer side to press the ring washers 609R to the side of the circular plate section 605R of the outside housing member 602R, thereby providing the locked state in which the housing member 600R cannot be turned relative to the cylindrical connection member 311R of the arm section 3R.

In the control mechanism in this embodiment, there is provided a control member 612R for controlling the sliding movement of the sliding member 611R by the spring washer 610R. With this configuration, the locked state of making it impossible for the housing member 600R to be turned relative to the cylindrical connection member 311R of the arm section 3R is realized, and return from the locked state to the turnable state is realized.

The control member 612R is an annular member which is engaged with the flange section 611Ra of the sliding member 611R. In this case, the control member 612R is provided inside the housing member 600R in such a state that its position in the direction along the axis line 60 is fixed and that it can be turned about the axis line 60. A handle 613R configured to be integral with the control member 612R is extended in a direction orthogonal to the axis line 60. With the handle 613R operated by the user, the control member 612R can be turned about the axis line 60.

In this embodiment, the control member 612R and the sliding member 611R abut on each other through a plurality of projections 614R which are fixed to the flange section 611Ra of the sliding member 611R at predetermined angular positions. In this example, as shown in FIGS. 14A and 14B which are sectional views along line B-B of FIG. 13, the projections 614R are balls which are rotatably fixed to the flange section 611Ra of the sliding member 611R.

Figure 14A:
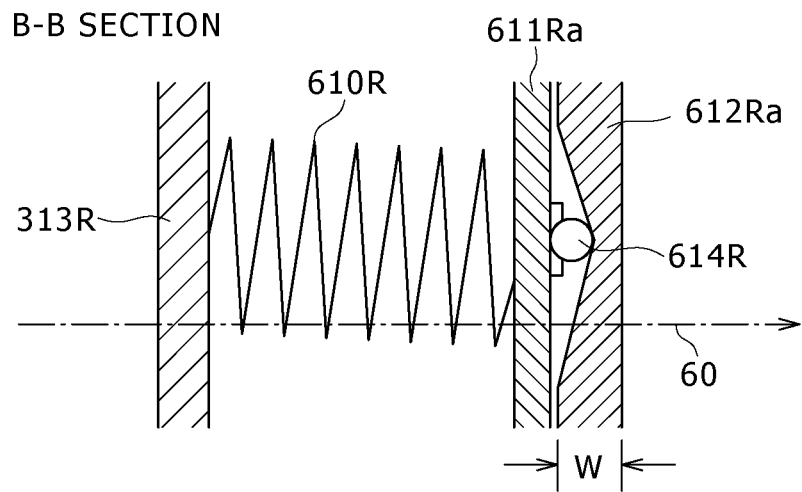
FIGS. 14A and 14B are illustrations of the second hinge section of the display stand in accordance with aspects of the present disclosure.
Figure 14B:
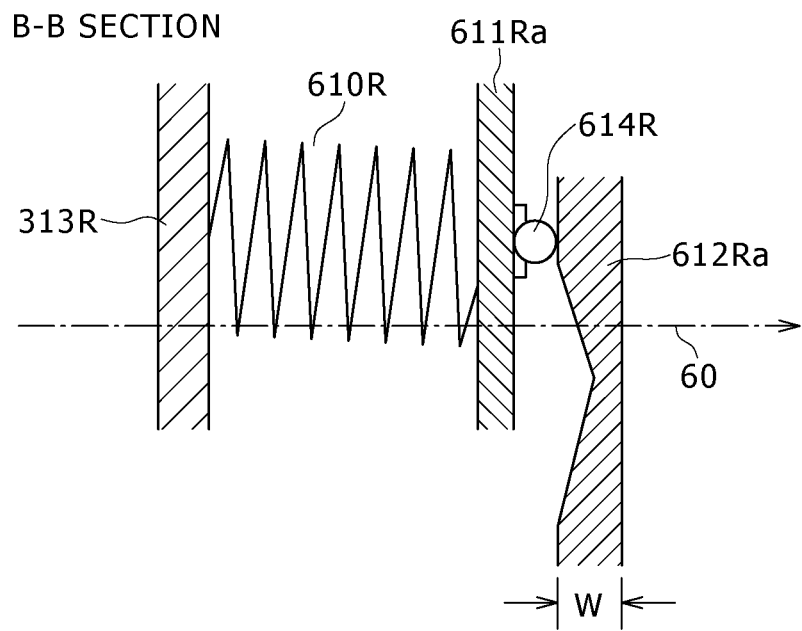

In addition, as shown in FIGS. 14A and 14B, the width W in the direction along the axis line 60 of an abutment section 612Ra, for abutment on the flange section 611Ra of the sliding member 611R through the projections 614R of the control member 612R, is variable within a predetermined angular range along the turning direction of the turning about the axis line 60.

The configuration as described above ensures that when the control member 612R is turned about the axis line 60 by turning the handle 613R, the width W of the abutment section 612Ra of the control member 612R in abutment on the projections 614R of the flange section 611Ra of the sliding member 611R can be varied. As mentioned above, the position of the control member 612R in the direction along the axis line 60 is fixed. This configuration ensures that the sliding member 611R can be moved sliding toward the side of the circular plate section 313R of the cylindrical connection member 311R of the arm section 3R, against the biasing force of the spring washer 610R, according to the variation in the width W of the abutment section 612Ra of the control member 612R in abutment on the projections 614R.

In the embodiment illustrated in FIG. 14A, when the control member 612R is located at such a position that the width W of the abutment section 612Ra of the control member 612R is minimized, in relation to the projections 614R of the flange section 611Ra of the sliding member 611R, the position of the sliding member 611R in the direction along the axis line 60 is mostly on the ring washer 609R side. In this position, the biasing force of the spring washer 610R causes the ring washers 609R to strongly press the circular plate section 605R of the outside housing member 602R, resulting in the locked state in which the housing member 600R cannot be turned relative to the arm section 3R.

When the control member 612R is turned to such a position that the width W of the abutment section 612Ra is enlarged in relation to the projections 614R at the flange section 611Ra of the sliding member 611R, as shown in FIG. 14B by operating the handle 613R, starting from the just-mentioned locked state, the flange section 611Ra of the sliding member 611R is moved sliding toward the side of the circular plate section 313R of the arm section 3R against the biasing force of the spring washer 610R. Therefore, the elastic biasing force with which the circular plate section 605R of the outside housing member 602R is pressed by the ring washers 609R is reduced, and the locked state in which the housing member 600R cannot be turned relative to the arm section 3R is canceled, resulting in a state in which the housing member 600R is turnable relative to the arm section 3R. In this unlocked state, the sliding member 611R and the control member 612R are turned relative to the cylindrical connection member 311R of the arm section 3R, together with the housing member 600R. The handle 613R is provided to be integral with the control member 612R. In this unlocked state, therefore, the handle 613R is also turned relative to the cylindrical connection section 311R of the arm section 3R, together with the housing member 600R.

Incidentally, in this embodiment, as shown in FIGS. 2 and 7, the handle 613R includes two handles, namely, a handle 613Ra and a handle 613Rb, which are located roughly in point symmetry about the control member 612R. In this case, the housing member 600R constituting the second hinge section 6R is attached and fixed to the right side wall section 1KR of the casing 1K of the display 1 so that the handle 613Ra is extended from the housing member 600R of the second hinge section 6R toward an upper end portion of the display 1 and that the handle 613Rb is extended from the housing member 600R toward a lower end portion of the display 1.

The length by which the handles 613Ra and 613Rb are extended respectively toward the upper end portion and the lower end portion is comparatively large and is, for example, not less than ¼ times the length between the upper end portion and the lower end portion of the display 1. As a result, as shown in FIG. 2, the handles 613Ra and 613Rb are elongated beyond the region of the presence of the operating unit 18R provided at the part of a right side portion of the bezel 1BZ of the display 1. This permits the user to operate the handles 613Ra and 613Rb by, for example, operating them on the tip side in the extension direction, while avoiding interference with the operating unit 18R.

The user can turn the control member 612R about the axis line 60 by drawing either one of the handle 613Ra and the handle 613Rb toward, or away from, the display 1 side. Then, with the control member 612R turned by operating either one of the handle 613Ra and the handle 613Rb, it is possible to perform a control for switching between the above-mentioned locked state in which the housing member 600R cannot be turned relative to the arm section 3R and the unlocked state in which the housing member 600R can be turned relative to the arm section 3R (because the locked state has been canceled).

While description has been thus made of the structure of the second hinge section 6R provided at a right side portion of the display 1, the structure of the second hinge section 6L provided at a left side portion of the display 1 may be the same as above, except that the structures are in left-right symmetry. Thus, as shown in FIGS. 2 and 7, the second hinge section 6L at the left side portion has a handle 613La extended toward an upper end portion of the display 1, and a handle 613Lb extended toward a lower end portion of the display 1. In addition, as shown in FIG. 2, the handles 613La and 613Lb are elongated beyond the region of the presence of the operating unit 18L provided at the part of a left side portion of the bezel 1BZ of the display 1.

In the case of the handle 613La and the handle 613Lb, also, by operating either one of these handles, it is possible to perform a control for switching between the above-mentioned locked state in which the housing member 600L cannot be turned relative to the arm section 3L and the unlocked state in which the housing member 600L can be turned relative to the arm section 3L (because the locked state has been canceled).

By operating either one of the handle 613La and the handle 613Lb and either one of the handle 613Ra and the handle 613Rb, the user can perform a control for switching between the unlocked state in which the display 1 can be freely turned relative to the arm sections 3L and 3R and the locked state in which the display 1 cannot be turned relative to the arm sections 3L and 3R.

Incidentally, in at least one embodiment, connection of a power supply line and a signal line to the display 1 is performed through the base member 4. Therefore, as shown in FIG. 1, a power supply plug 7 is led out from the base member 4 through a power supply cord 7C, and a connector plug 8 is led out from the base member 4 through a signal cord 8C.

Then, the power supply cord 7C and the signal cord 8C are collected into a single cord 9C, which is passed through the inside of the arm section 3R and through the hinge section 6R to be connected to a power supply terminal and a signal terminal (both not shown) of the display 1, as shown in FIG. 13.

Exemplary arm lengths and distance between front end section of base member 4 and first hinge section will now be described. In the embodiment shown in FIG. 1, the arm length of the pair of arm sections 3L, 3R is set such that when the second end portions of the arms 3L, 3R are turned in a direction from the front end section 4F toward the back end section 4B of the base member 4, the display 1 can be put into an upright or substantially upright state through the functions of the first hinge sections 5L, 5R and the second hinge sections 6L, 6R.

Figure 15:
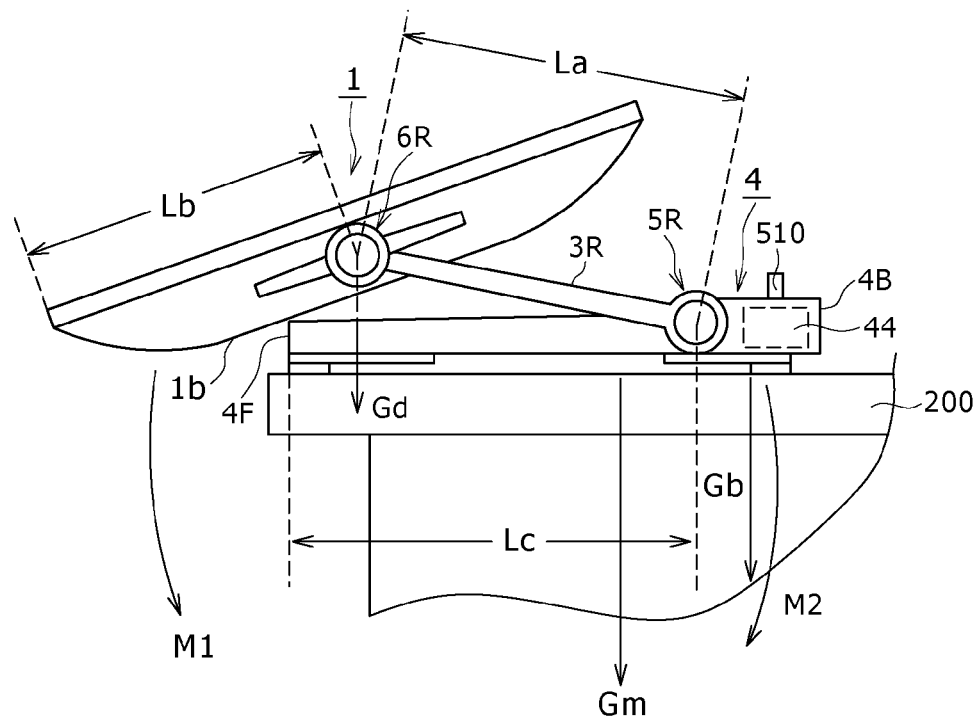
FIG. 15 is a side view of a display stand supporting a display thereon in a first position in accordance with aspects of the present disclosure.

Therefore, in at least one embodiment as shown in FIG. 15, the arm length La of the pair of arm sections 3L, 3R is set to be greater than the length Lb from the lower end portion of the display 1 to the second hinge sections 6L, 6R in the vertical direction from the lower end portion toward the upper end portion of the display 1 so that the display 1 can be put into the upright state. Therefore, in at least one embodiment, the lengths are so set that La>Lb. In other embodiments where it is not strictly necessary to put the display 1 into the upright state, or where it suffices to put the display 1 into a substantially upright state, the above-mentioned length La can be less than Lb.

Furthermore, the arm length La of the pair of arm sections 3L, 3R may be set longer so that, by putting the second hinge sections 6R, 6L or the arm sections 3R, 3L in contact with the mounting base such as a desktop, or by setting the angle α between the longitudinal direction of the arm sections 3R, 3L and the upper surface of the base member 4 to be substantially zero, in the condition where the stand 2 is mounted on the mounting base, it is possible to restrict the turning of the first hinge sections 5R, 5L and it is possible to put the display 1 into an upright or substantially upright state as shown in FIG. 1 in the condition where the turning of the first hinge sections 5R, 5L is thus restricted.

This ensures that by regulating the angle α of the longitudinal direction of the arm sections 3R, 3L relative to the upper surface of the base member 4 and by regulating the angle β between the display surface of the display 1 and the longitudinal direction of the arm sections 3R, 3L through turning of the display 1 relative to the arm sections 3R, 3L under the functions of the second hinge sections 6R, 6L, it is possible for the angle γ between the display surface of the display 1 and the upper surface of the base member 4 to be set to an arbitrary angle in the range of 30 to 85 degrees ($30° \leq \gamma \leq 85°$).

To be more specific, in the case where the angle α between the arm sections 3L, 3R and the base member 4 is in the range of $0° < \alpha < 70°$, by simultaneously operating either one of the handle 613La and the handle 613Lb and either one of the handle 613Ra and the handle 613Rb, the user can put the display 1 in the turnable state and can adjust the angles α, β and γ to desired values. Then, the lower end portion of the display 1 is put into contact with the upper surface of the base member 4 as shown in FIG. 1. In this manner, the angle γ, namely, the angle of the display screen of the display 1, can be adjusted to any angle desired by the user, inclusive of the upright state. Then, by simultaneously operating either one of the handle 613La and the handle 613Lb and either one of the handle 613Ra and the handle 613Rb, the user can put the display 1 into the locked state in which the display 1 would not be turned relative to the arm sections 3L, 3R. Consequently, the display 1 can be supported stably.

In addition, when a setting of α≈70° is made as shown in FIG. 11 and the arm sections 3L and 3R are locked to the base member 4, the display 1 can be turned relative to the second end portions of the arm sections 3L and 3R locked at α≈70° under the functions of the second hinge sections 6L and 6R.

Then, when the user realizes the locked state in which the display 1 would not be turned, by simultaneously operating either one of the handle 613La and the handle 613Lb and either one of the handle 613Ra and the handle 613Rb in the condition where the angle β is adjusted to a desired value, the display 1 can be supported by the stand 2 in the state of being spaced from the base member 4, as shown in FIG. 11. It is to be appreciated that when the display screen of the display 1 is set upright, the lower end portion of the display 1 may be in contact with the upper surface of the base member 4 as shown in FIG. 1 or may be out of contact with the upper surface of the base member 4.

In the condition of FIG. 11, then, when the user draws the canceling lever member 510 toward the front end section 4F of the base member 4, the lock of the arm sections 3L and 3R to the base member 4 is canceled, resulting in that the arm sections 3L and 3R are biased in the direction of arrow 30a in FIG. 11, as mentioned above, and become turnable relative to the base member 4.

Incidentally, in the case where the display 1 is turned through the function of the second hinge sections 6L and 6R, for example as shown in FIG. 11, the handles 613La, 613Lb, 613Ra, 613Rb are turned in conjunction with the turning of the display 1 so as to maintain their positional relationships with the display 1.

In one embodiment, the arm length La of the pair of arm sections 3L and 3R, or the distance between each of the center positions of turning of the first hinge sections 5L, 5R and each of the center positions of turning of the second hinge sections 6L and 6R, is set to be smaller than the length Lc from each of the center positions of turning of the first hinge sections 5L and 5R and the front end section 4F of the base member 4; namely, a setting of La<Lc is adopted.

As a result, as shown in FIG. 15, when the second end portions of the pair of arm sections 3L and 3R are turned in the direction from the side of the back end section 4B toward the front end section 4F of the base member 4, that portion of a back surface 1b of the display 1 which is between the lower end portion of the display 1 and the center positions of turning of the second hinge sections 6L and 6R in the direction from the lower end portion toward the upper end portion of the display 1 comes into contact with the front end section 4F of the base member 4, whereby turning of the second end portions of the pair of arm sections 3L and 3R toward the front end section 4F of the base member 4 is restricted.

Because the pair of arm sections 3L and 3R are disposed at the parts of the step sections 19L and 19R on the back side of the display 1, the pair of arm sections 3L and 3R are not interposed between the back surface 1b of the display 1 and the base member 4. Therefore, the thickness from the upper surface of the base member 4 to the display screen of the display 1 can be set to a thickness which is not dependent on the thickness of the arm sections 3L and 3R but is dependent on the thickness of the display 1. Accordingly, the height from the upper surface of a desk 200 to the display screen of the display 1 may be lowered, as compared with previous displays and display stands.

In addition, in this embodiment, the center of gravity Gd of the display 1 is located at a central portion in the vertical direction from the lower end portion toward the upper end portion of the display 1. Therefore, the display 1 and the arm sections 3L and 3R are interconnected by the second hinge sections 6L and 6R at positions corresponding to the position where the center of gravity Gd of the display 1 is present. This configuration ensures that, also when the second end portions of the pair of arm sections 3L and 3R are turned in the direction from the back end section 4B toward the front end section 4F of the base member 4, as shown in FIG. 15, the center of gravity Gd of the display 1 is constantly located between the front end section 4F and the back end section 4B of the base member 4. Accordingly, in the state of FIG. 15, the position of the center of gravity Gm of the coordinate input device as a whole including the display 1 and the stand 2 is located between the position of the center of gravity Gb of the base member 4 itself and the position of the center of gravity Gd of the display 1, and is always present on the side of the back end section of the base member 4 in relation to the center of gravity Gd of the display 1.

In at least one embodiment, the weight of the base member 4 is set to be greater than the weight of the display 1. In one example, the weight of the base member 4 is twice the weight of the display 1. Therefore, the position of the center of gravity Gm of the coordinate input device as a whole is set toward the back end section 4B side in the direction from the front end section 4F toward the back end section 4B of the base member 4. Consequently, even when the display 1 is set into a state in which the lower end portion side thereof protrudes from the upper surface of the desk 200, as shown in FIG. 15, the display 1 is stably supported by the stand 2 unless at least the position of the center of gravity Gm of the coordinate input device as a whole protrudes from the upper surface of the desk 200.

Specifically, even in the condition where the lower end portion side of the display 1 protrudes from the desk 200, as shown in FIG. 15, a turning moment M2 in turning due to the center of gravity Gm of the coordinate input device as a whole, which moment is in the reverse direction to a turning moment M1 acting on the lower end portion side of the display 1, is greater than the turning moment M1, so that the display 1 is kept stable. In addition, in this embodiment, the weight of the stand 2 is greater than the weight of the display 1. Therefore, even if a normal force in operation by the operator is exerted on the lower end portion side of the display 1 protruding from the desk 200, the relation M2>M1 is normally kept, so that the display 1 is kept stable.

For example, if a user facing the desk 200 has excessively drawn the display 1 toward himself or herself with the result that the base member 4 is greatly deviated from the desk 200, the stand 2 connected to the display 1 may begin to slide off the desk 200. In such a situation, in one embodiment, the braking members 43a and 43c provided on the bottom surface 41 of the base member 4 can prevent or stop the stand 2 connected to the display 1 from sliding. Specifically, when the user has excessively drawn the display 1 toward himself or herself and one or both of the leg members 42a and 42c on the side of the bottom surface 41 of the base member 4 have come off the desk 200, as shown in FIG. 16, the braking members 43a and 43c provided on the side of the bottom surface 41 of the base member 4 make contact with the desk 200, as mentioned above, so that movement of the base member 4 toward the user's side is stopped by the frictional forces between the desk 200 and the braking members 43a, 43c.

Figure 16:
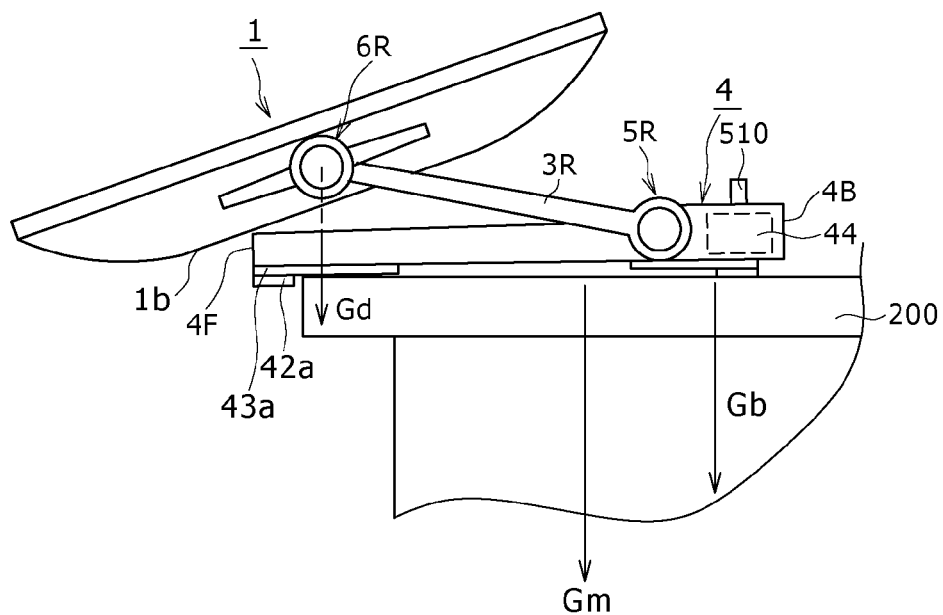
FIG. 16 is a side view of a display stand supporting a display thereon having stopped sliding by braking members in accordance with aspects of the present disclosure.

In at least one embodiment, even in the condition where one or both of the leg members 42a and 42c on the side of the bottom surface 41 of the base member 4 have come off the desk 200, as shown in FIG. 16, the center of gravity Gm of the coordinate input device as a whole is located between the front end section 4F and the back end section 4B of the base member 4, so that the display 1 is stably supported by the stand 2. In other words, slipping-off of both the display 1 and the stand 2 from the desk 200 is prevented from occurring. Particularly, in the embodiment in which the weights of the display 1 and the base member 4 are set in the above-mentioned relationship, and the position of the center of gravity of the base member 4 is set on the back end section 4B side relative to the midpoint between the front end section 4F and the back end section 4B of the base member 4, due to the presence of the weight 44. This ensures better stability.

Therefore, in the case where a coordinate input device includes the stand 2 according to this embodiment, at least one of a position detector of, for example, the electrostatic system for detection of a finger operation and a position detector of, for example, the electromagnetic coupling system for detection of an operation with a pen, and the display 1 with one another is used, the user can safely use the coordinate input device by drawing the coordinate input device closer to himself or herself even where the display screen of the display 1 is a large-type one.

Figure 17:
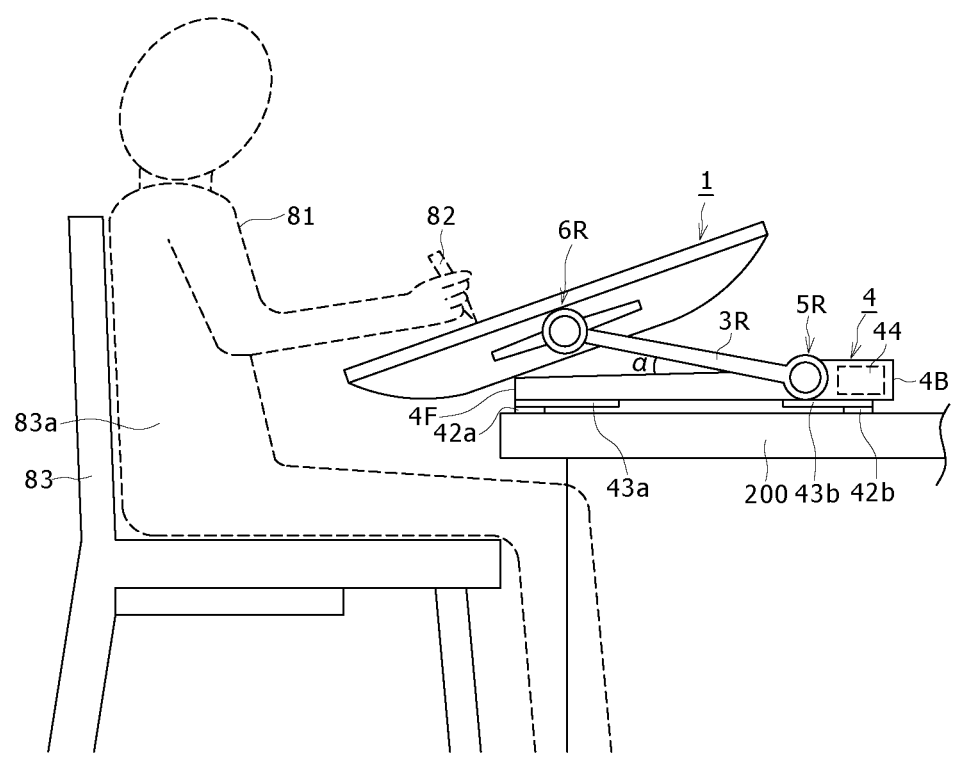
FIG. 17 is an illustration of an example of a use mode of the display stand in accordance with aspects of the present disclosure.

To be more specific, in the case of using the coordinate input device shown in FIG. 17, in the condition where the base member 4 of the stand 2 is placed on the upper surface of the desk 200, the user 81 reduces the angle α between the upper surface of the base member 4 and the arm sections 3R and 3L, and adjust the angle β between the arm sections 3R and 3L and the display screen of the display 1 to a value approximate to 180°, thereby setting the display screen (an operation position input surface) of the display 1 into a nearly horizontal state. While keeping this condition, the user draws the display 1 toward himself or herself, whereby operations on the display screen can be carried out stably. In this condition, the arm sections 3L and 3R are not interposed between the back surface 1b of the display 1 and the upper surface of the base member 4, as above-mentioned. Therefore, the height of the display screen from the upper surface of the desk 200 is prevented from being needlessly increased due to the presence of the arm sections 3L, 3R.

Therefore, the user can observe the contents of display by putting his or her face close to the display screen drawn close to himself or herself, while keeping a natural posture. In addition, input operations by use of a position indicator such as a pen 82 or a finger can be performed while keeping a natural posture.

In addition, the friction between the upper surface of the desk 200 and the leg members 42a, 42b, 42c, 42d of the base member 4 is set to a low value so as to permit sliding movement in the case where the user 81 desires to perform input operations using the pen 82 at a position more remote than himself or herself, or at a position on the upper side of the display screen. Therefore, when the display 1 or the base member 4 is gripped and drawn toward the user 81, the display 1 can be moved comparatively easily.

Even when the user 81 has drawn the display 1 excessively toward himself or herself with the result that the leg members 42a and 42c of the base member 4 have come off the desk 200 as shown in FIG. 16, the braking members 43a and 43c make contact with the desk 200, and movement of the base member 4 toward the user's side is stopped by the large frictional forces generated between the desk 200 and the braking members 43a, 43c. Therefore, the user 81 can slidably move the coordinate input device corresponding to the input operations on the coordinate input device, without worrying about the display 1 dropping off from the desk 200. Consequently, operability in using the coordinate input device can be enhanced.

While the base member 4 is formed from a resin(s) in the above-described embodiments, the base member 4 may be formed from other materials, such as a metallic material(s). In that case, the thickness of the base member 4 may be made greater on the back end section 4B side than on the front end section 4F side, whereby the position of the center of gravity of the base member 4 in the direction from the front end section 4F toward the back end section 4B can be easily deviated to the back end section 4B side relative to the midpoint between the front end section 4F and the back end section 4B, without using any weight 44.

Furthermore, while a rubber sheet as an elastic member is used as the braking member in the above-described embodiments, the elastic member is not limiting, and any braking member can be used insofar as it produces a frictional force between itself and the mounting base, such as a desk, so that sliding movement of the base member can be stopped.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A display stand comprising: a base member having a pair of side surface sections, a front end section, and a back end section; a pair of arm sections comprising a first arm section and a second arm section; first hinge sections by which a first end portion of the first arm section and a second first end portion of the second arm section are connected respectively to a first side section and a second side section of the pair of side surface sections of the base member so that the pair of arm sections can be turned relative to the base member, wherein the first side section is different from the second side section; and second hinge sections by which second end portions of the pair of arm sections are connected to a display so that the display can be turned relative to the pair of arm sections, wherein the second hinge sections are connected to side surface sections of the display, wherein a distance between a respective one of the first hinge sections and a respective one of the second hinge sections is less than a distance between the respective one of the first hinge sections and the front end section of the base member, wherein an arm length of the pair of arm sections is set such that when the second end portions of the pair of arm sections are turned in a first direction relative to the base member from the front end section toward the back end section of the base member, the display is put into a substantially upright state by rotation of the first hinge sections and the second hinge sections, wherein when the second end portions of the pair of arm sections are turned in a second direction relative to the base member from the back end section toward the front end section of the base member, a back surface of the display makes contact with the base member without the pair of arm sections being interposed therebetween, a lower end portion of the display is located forward of the front end section of the base member, and a position of contact of the back surface of the display with the base member is set between the lower end portion of the display and positions of connection of the second hinge sections, wherein handles are provided at the second hinge sections for controlling the turning of the display, and wherein turning of the display through the function of the second hinge sections is performed by turning toward a display side any of the handles, provided at the second hinge sections for controlling the turning of the display, wherein the handles each extend both in a direction toward the lower end portion of the display and in a direction toward the upper end portion of the display.

2. The display stand according to claim 1, wherein the second hinge sections are connected to the side surface sections of the display at positions corresponding to the center of gravity of the display, the center of gravity being present between the lower end portion and an upper end portion of the display.

3. The display stand according to claim 1, wherein a thickness of the base member is greater proximate the back end section than a thickness of the base member is proximate the side of the front end section.

4. The display stand according to claim 1, wherein a member for deviation of the center of gravity of the base member is disposed proximate the back end section of the base member so that the position of the center of gravity of the base member is deviated toward a side of the back end section from a midpoint between the front end section and the back end section of the base member, in the first direction from the front end section toward the back end section of the base member.

5. The display stand according to claim 1, wherein the second hinge sections are each provided on the side surface section of the display at a substantially central position between the lower end portion and an upper end portion of the display so that the display can be turned in either the first or second directions by a similar force through function of the second hinge sections.

6. The display stand according to claim 1, wherein turning of the display through the function of the second hinge sections is performed by turning toward a display side any of the handles provided at the second hinge sections for controlling the turning of the display.

7. The display stand according to claim 1, wherein turning of the display through the function of the second hinge sections is realized when any of the handles provided at the second hinge sections for controlling the turning of the display is turned in any direction.

8. The display stand according to claim 1, wherein the handles are turned together with the display when the display is turned through the function of the second hinge sections.

9. A display stand comprising:
a base member having a pair of side surface sections, a front end section, and a back end section; a pair of arm sections comprising a first arm section and a second arm section; first hinge sections by which a first end portion of the first arm section and a first end portion of the second arm section are connected respectively to a first side section and a second side section of the pair of side surface sections of the base member so that the pair of arm sections can be turned relative to the base member, wherein the first side section is different from the second side section; and second hinge sections by which second end portions of the pair of arm sections are connected to a display so that the display can be turned relative to the pair of arm sections, wherein the second hinge sections are connected to side surface sections of the display, wherein a distance between a respective one of the first hinge sections and a respective one of the second hinge sections is less than a distance between the respective one of the first hinge sections and the front end section of the base member, wherein an arm length of the pair of arm sections is set such that when the second end portions of the pair of arm sections are turned in a first direction relative to the base member from the front end section toward the back end section of the base member, the display is put into a substantially upright state by rotation of the first hinge sections and the second hinge sections, wherein when the second end portions of the pair of arm sections are turned in a second direction relative to the base member from the back end section toward the front end section of the base member, a back surface of the display makes contact with the base member without the pair of arm sections being interposed therebetween, a lower end portion of the display is located forward of the front end section of the base member, and a position of contact of the back surface of the display with the base member is set between the lower end portion of the display and positions of connection of the second hinge sections, wherein handles are provided at the second hinge sections for controlling the turning of the display, wherein turning of the display through the function of the second hinge sections is performed by turning toward a display side any of the handles provided at the second hinge sections for controlling the turning of the display, and wherein when the side surface sections of the display are provided with step sections, the second hinge sections are connected to the step sections, and the handles provided at the second hinge sections are at least partly disposed at the step sections.

10. The display stand according to claim 9, wherein the handles provided at the second hinge sections are disposed at the step sections.

11. The display stand according to claim 1, wherein a bottom surface portion of the base member includes a leg member having a predetermined height configured to permit the stand to slide on an installation surface on a desk, and wherein the bottom surface portion of the base member further includes a braking member having a predetermined area configured to brake a sliding movement of the base member when the stand slides on the installation surface on the desk and the leg member comes off the installation surface on the desk.

12. The display stand according to claim 11, wherein the leg member having the predetermined height for permitting the stand to slide on the installation surface on the desk has a predetermined area, and the braking member for braking the sliding movement of the base member is disposed overlapping with the leg member.

13. The display stand according to claim 1, wherein a sensor for inputting a position indicated by a position indicator is disposed at a display surface of the display.

14. The display stand of claim 1, wherein the base member has an upper surface, and wherein the back surface of the display makes contact with the upper surface of the base member without the pair of arm sections being interposed therebetween.

15. The display stand of claim 1, wherein the base member has an upper surface and a bottom surface, and wherein the pair of side surface sections are located between the upper surface and the bottom surface.

* * * * *

UNITED STATES PATENT AND TRADEMARK OFFICE
CERTIFICATE OF CORRECTION

PATENT NO. : 9,182,071 B2
APPLICATION NO. : 13/241042
DATED : November 10, 2015
INVENTOR(S) : Harper et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this
Third Day of May, 2016

Michelle K. Lee
*Director of the United States Patent and Trademark Office*